(12) United States Patent
Sawano

(10) Patent No.: US 11,933,337 B2
(45) Date of Patent: Mar. 19, 2024

(54) CLIP AND CLIP ATTACHING STRUCTURE

(71) Applicant: NIFCO INC., Yokosuka (JP)

(72) Inventor: Kota Sawano, Yokosuka (JP)

(73) Assignee: NIFCO INC., Yokosuka (JP)

( * ) Notice: Subject to any disclaimer, the term of this patent is extended or adjusted under 35 U.S.C. 154(b) by 274 days.

(21) Appl. No.: 17/640,071

(22) PCT Filed: Aug. 4, 2020

(86) PCT No.: PCT/JP2020/029904
§ 371 (c)(1),
(2) Date: Mar. 3, 2022

(87) PCT Pub. No.: WO2021/049209
PCT Pub. Date: Mar. 18, 2021

(65) Prior Publication Data
US 2022/0325738 A1    Oct. 13, 2022

(30) Foreign Application Priority Data
Sep. 12, 2019 (JP) .................. 2019-166538

(51) Int. Cl.
*F16B 19/10* (2006.01)
(52) U.S. Cl.
CPC .......... *F16B 19/1081* (2013.01); *F16B 19/10* (2013.01)
(58) Field of Classification Search
CPC ...... F16B 5/065; F16B 21/084; F16B 21/086; F16B 19/10; F16B 19/108; F16B 19/1081; F16B 19/109
(Continued)

(56) References Cited

U.S. PATENT DOCUMENTS 4,176,428 A    12/1979 Kimura
5,775,860 A *   7/1998 Meyer ................. F16B 19/1081
                                                    411/41
(Continued)

FOREIGN PATENT DOCUMENTS

CN    1538080 A    10/2004
CN    1752466 A     3/2006
(Continued)

OTHER PUBLICATIONS

China National Intellectual Property Administration, "Office Action for Chinese Patent Application 202080063826.6," dated Aug. 24, 2023.
(Continued)

*Primary Examiner* — Roberta S Delisle
(74) *Attorney, Agent, or Firm* — Manabu Kanesaka

(57) ABSTRACT

A clip includes a male member having a head part and a rod-shaped pin part; and a female member having a cylindrical part into which the pin part is inserted, a first engaging hook on the cylindrical part engaging the pin part at a first inserting position of the pin part and a second inserting position on a back side in an inserting direction, and a second engaging hook engaging an edge of the attaching hole when the cylindrical part is inserted into the attaching hole. The pin part includes a tolerance part allowing elastic deformation of the second engaging hook when the pin part is in the first inserting position, and a stopping part positioned on the head part side supporting the second engaging hook from inside the cylindrical part and stopping elastic deformation of the second engaging hook when the pin part is in the second inserting position.

8 Claims, 32 Drawing Sheets

(58) Field of Classification Search
USPC .......................................... 411/45, 508–510
See application file for complete search history.

(56) References Cited

U.S. PATENT DOCUMENTS

| | | | | |
|---|---|---|---|---|
| 7,862,272 | B2* | 1/2011 | Nakajima | F16B 21/084 |
| | | | | 411/48 |
| 8,430,421 | B2* | 4/2013 | Kirchen | B60R 21/217 |
| | | | | 411/549 |
| 8,572,818 | B2* | 11/2013 | Hofmann | F16B 21/078 |
| | | | | 24/297 |
| 8,662,807 | B2* | 3/2014 | Adachi | B60R 13/0206 |
| | | | | 411/49 |
| 8,794,887 | B2 | 8/2014 | Nishino | |
| 2005/0163587 | A1* | 7/2005 | Randez Perez | F16B 5/065 |
| | | | | 411/45 |
| 2006/0068642 | A1 | 3/2006 | Hamaguchi | |
| 2008/0141501 | A1 | 6/2008 | Kuroda | |
| 2013/0136559 | A1* | 5/2013 | Hauser | F16B 19/1081 |
| | | | | 411/45 |
| 2014/0093325 | A1* | 4/2014 | Mizukoshi | F16B 13/063 |
| | | | | 411/45 |
| 2015/0190175 | A1* | 7/2015 | Oldakowski | A61B 17/7007 |
| | | | | 606/246 |

FOREIGN PATENT DOCUMENTS

| | | |
|---|---|---|
| CN | 101131173 A | 2/2008 |
| CN | 101315093 A | 12/2008 |
| CN | 101683837 A | 3/2010 |
| CN | 102575702 A | 7/2012 |
| CN | 103362910 A | 10/2013 |
| DE | 19520643 A1 | 12/1996 |
| JP | H08-270624 A | 10/1996 |
| JP | 2007-056895 A | 3/2007 |
| JP | 5243749 B2 | 7/2013 |
| JP | 2016-525189 A | 8/2016 |

OTHER PUBLICATIONS

China National Intellectual Property Administration, "Search Report for Chinese Patent Application 202080063826.6," dated Aug. 18, 2023.

European Patent Office, "Extended European Search Report with Search Opinion for European Patent Application 20862424.7," dated Sep. 14, 2023.

PCT/ISA/210, "International Search Report for International Application No. PCT/JP2020/029904," dated Oct. 6, 2020.

* cited by examiner

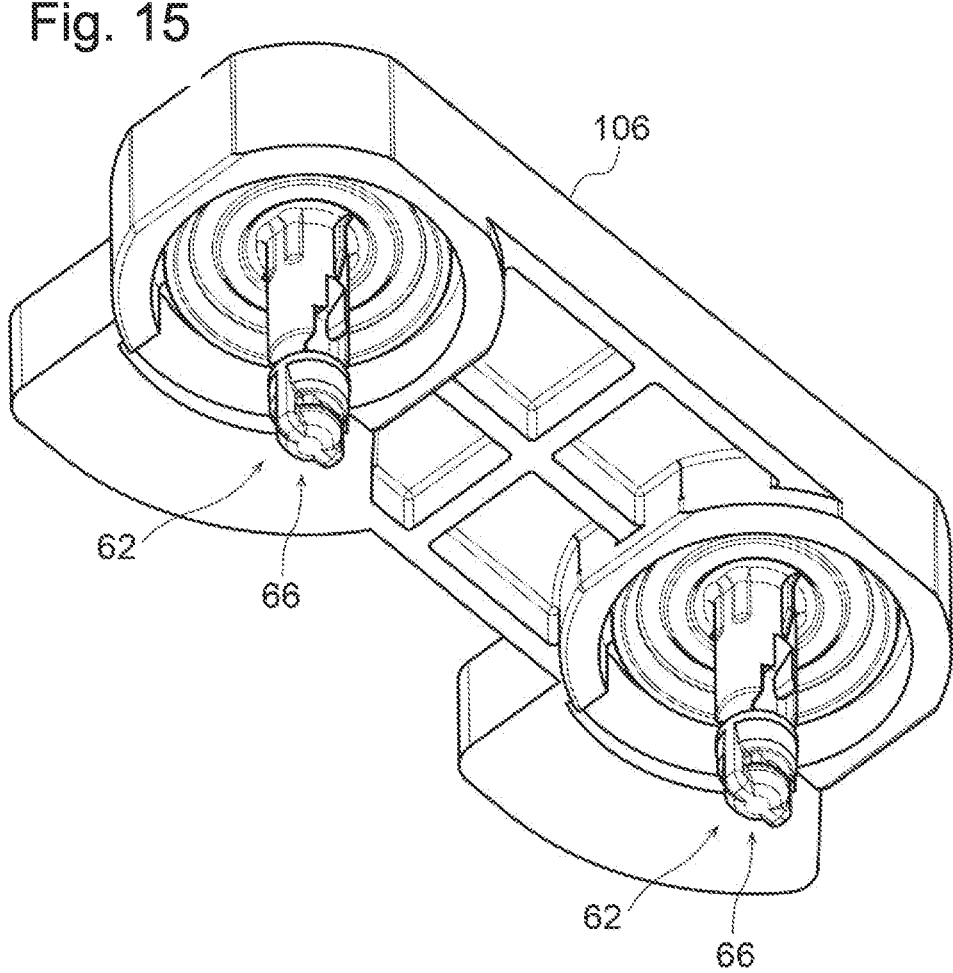

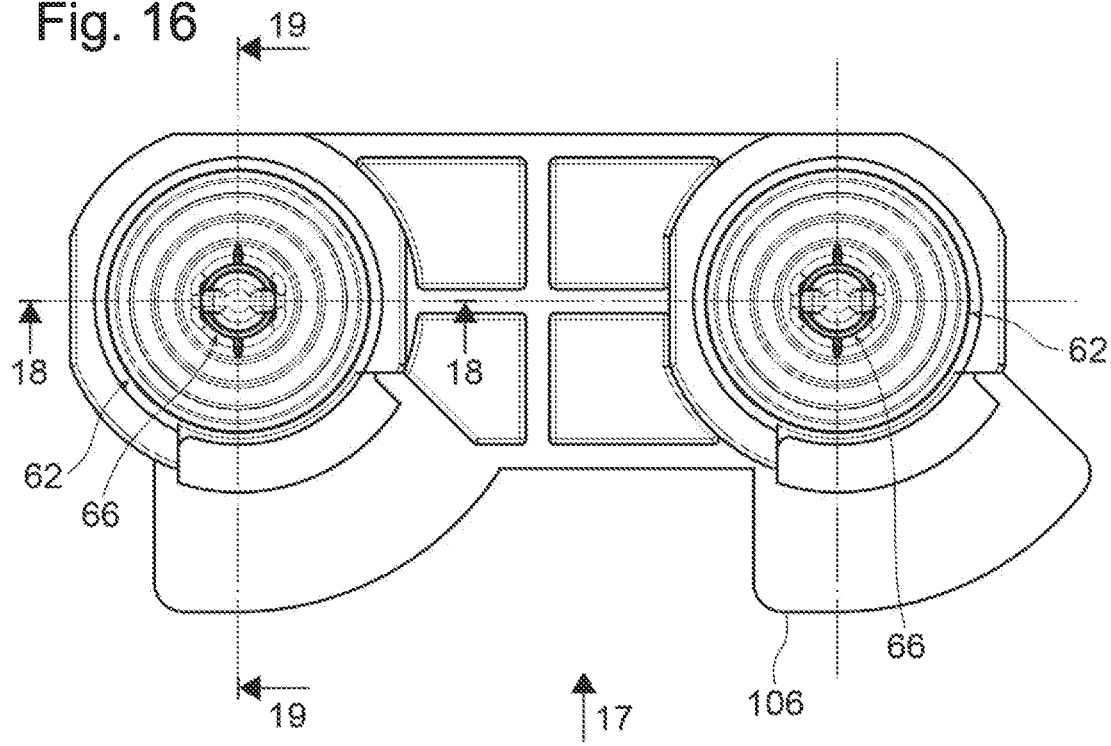
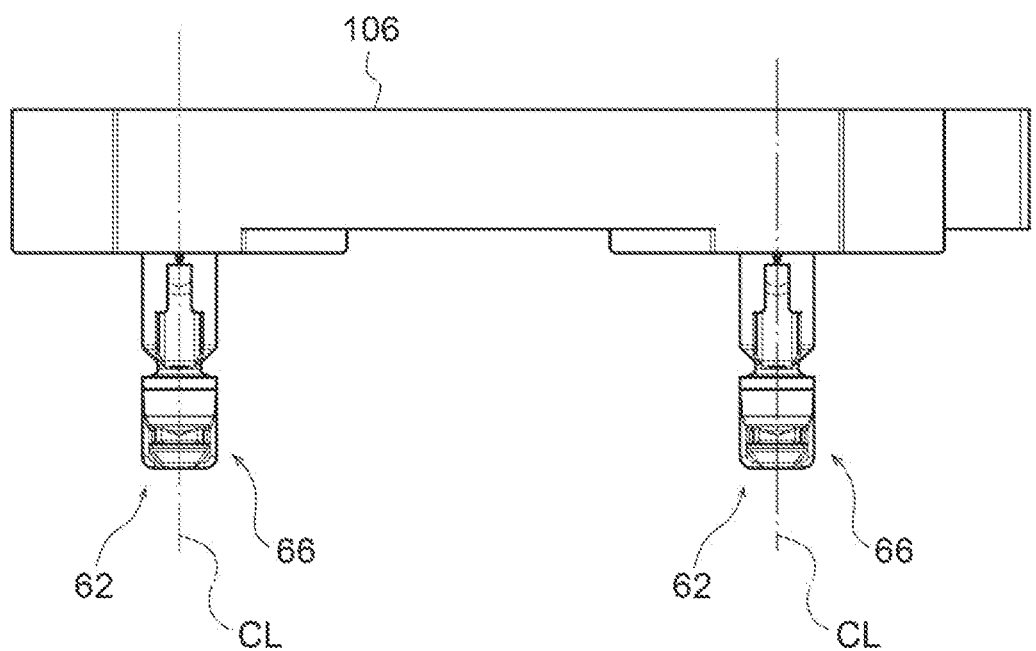

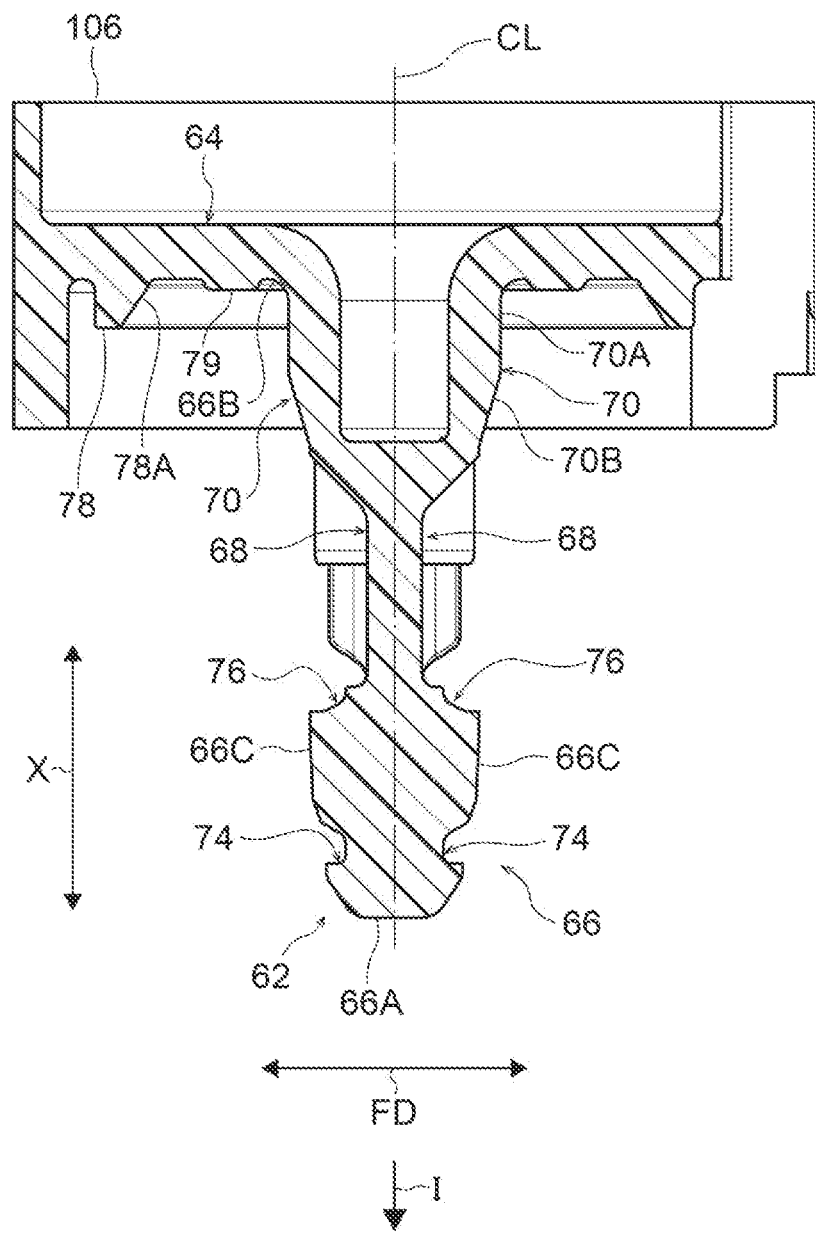

CLIP AND CLIP ATTACHING STRUCTURE

RELATED APPLICATIONS

The present application is National Phase of International Application No. PCT/JP2020/029904 filed Aug. 3, 2020, and claims priority from Japanese Application No. 2019-166538, filed Sep. 12, 2019, the disclosure of which is hereby incorporated by reference herein in its entirety.

TECHNICAL FIELD

The present disclosure relates to a clip and a clip attaching structure.

BACKGROUND ART

Japanese Patent No. 5243749 discloses a clip formed of a male member and a female member. With this clip, the male member and the female member are first provisionally attached by inserting a pin part of the male member into a cylindrical part of the female member, then, the female member is provisionally held in an attaching member by inserting the cylindrical part of the female member into an attaching hole of the attaching member. Finally, the female member is held in the attaching member, the male member is assembled to the female member, and the clip is assembled to the attaching member by further inserting the pin part into the cylindrical part.

SUMMARY OF THE INVENTION

Problem to be Solved by the Invention

In Japanese Patent No. 5243749, a male member and a female member are provisionally assembled by inserting a pin part into a cylindrical part, next, the female member is provisionally held in an attaching member, then, the female member is held in the attaching member and the male member and female member are assembled by further inserting the pin part into the cylindrical part. Thus, the operation for attaching the attaching member of the clip made of the male member and the female member is complicated.

In view of the above facts, the problem for the present disclosure is to provide a clip and a clip attaching structure in which attaching to the attaching member can be accomplished by a simple operation.

Means for Solving the Problem

The clip according to a first aspect of the present disclosure includes a male member having a head part and a rod-shaped pin part that protrudes from the head part; and a female member having a cylindrical part into which when inserted into an attaching hole of an attaching member, the pin part is inserted, a first engaging hook provided on the cylindrical part that engages with the pin part at both a first inserting position of the pin part and a second inserting position thereof that is further on a back side in an inserting direction than the first inserting position, and a second engaging hook provided on the cylindrical part and elastically deformable in an inward/outward direction of the cylindrical part that engages with an edge of the attaching hole when the cylindrical part is inserted into the attaching hole. An external form of the head part is larger than an external form of the female member, and the pin part is provided with a tolerance part that allows elastic deformation of the second engaging hook toward an inside of the cylindrical part when the pin part is in the first inserting position, and a stopping part positioned more on the head part side than the tolerance part that supports the second engaging hook from inside the cylindrical part and stops elastic deformation of the second engaging hook toward the inside of the cylindrical part when the pin part is in the second inserting position.

With the clip according to the first aspect, when the pin part is inserted to the first inserting position inside the cylindrical part of the female member while the head part of the male member is being pushed, the pin part and the first engaging hook engage, and the male member and the female member are provisionally assembled. Next, the head part of the male member is pushed and the cylindrical part of the female member is inserted into the attaching hole of the attaching member. Here, when the pin part is in the first inserting position, the tolerance part of the pin part allows elastic deformation of the second engaging hook toward the inside of the cylindrical part, and thus the cylindrical part passes the second engaging hook and is inserted in the attaching hole. After the second engaging hook passes through the attaching hole, the second engaging hook returns elastically, and the second engaging hook engages with an edge of the attaching hole. Furthermore, when the pin part reaches the second inserting position, the second engaging hook is supported from inside the cylindrical part by the stopping part of the pin part, thus stopping the elastic deformation of the second engaging hook toward the inside of the cylinder. This holds the female member in the attaching member. Additionally, when the pin part is in the second inserting position, the pin part and the first engaging hook engage and the male member and the female member are assembled (the assembly). In this way, the clip is attached to the attaching member.

Here, with the clip described above, after the male member and the female member are provisionally assembled, the cylindrical part of the female member is inserted into the attaching hole of the attaching part while the head part of the male member is being pushed, which causes the female member to be held in the attaching member, the male member and female member to be assembled (the assembly), and the clip to be attached to the attaching member. That is, since the clip described above can be attached to the attaching member by a single pushing operation, the clip can be attached to the attaching member by a simple operation.

Furthermore, with the clip described above, since the external form of the head part of the male member is made larger than the external form of the female member, pushing the head part is easier than in, for example, a configuration where the external form of the head part is smaller than the external form of the female member, thus making an operation for pushing the pin part in simpler.

With the clip according to a second aspect of the present disclosure, the second engaging hook in the clip according to the first embodiment is pushed toward the outside of the cylindrical part by the stopping part when the pin part is in the second inserting position.

With the clip according to the second aspect, since the second engaging hook is pushed toward the outside of the cylindrical part by the stopping part when the pin part is in the second inserting position, a strength with which the second engaging hook engages with an attaching hole peripheral part is enhanced.

With the clip according to a third aspect of the present disclosure, the head part in the clip according to the first or second aspect is provided with a circular convex part that surrounds the pin part, and the female member includes a flange part that extends from an end part on a side opposite an inserting direction of the cylindrical part in a direction orthogonal to the inserting direction, an elastically deformable circular first seal part that extends from an outer circumference of the flange part and abuts the circular convex part when the pin part is in the second inserting position, and a second seal part that extends from the outer circumference of the flange part and makes contact with the peripheral part of the attaching hole when the cylindrical part is inserted into the attaching hole.

With the clip according to the third aspect, since the first seal part makes contact with the circular convex part of the male member when the pin part is in the second inserting position, a seal is formed between the male member and the female member by the first seal part. Furthermore, since the second seal part makes contact with the attaching hole peripheral part when the cylindrical part of the female member is inserted into the attaching hole, a seal is formed between the attaching member and the female member by the second seal part. Thus, when the clip is attached to the attaching member, a seal is formed between the male member and the female member by the first seal part and a seal is formed between the female member and the attaching member by the second seal part. That is, the clip described above can be attached to the attaching member and secured in a sealed state by a simple operation.

With the clip according to a fourth aspect of the present disclosure, the pin part in the clip according to any one of the first through the third aspects includes a first engaged part that engages with the first engaging hook and limits movement of the pin part toward a side opposite the inserting direction when the pin part is in the first inserting position, and a second engaged part that engages with the first engaging hook and limits movement of the pin part toward a side opposite the inserting direction when the pin part is in the second inserting position.

With the clip according to the fourth aspect, since the first engaging hook and the first engaged part engage when the pin part is in the first inserting position, movement of the pin part toward a side opposite the inserting direction is limited. That is, the pin part is held in the cylindrical part by the engagement between the first engaging hook and the first engaged part when the pin part is in the first inserting position.

Additionally, with the clip described above, since the first engaging hook and the second engaged part engage when the pin part is in the second inserting position, movement of the pin part toward a side opposite the inserting direction is limited. That is, the pin part is held in the cylindrical part by the engagement between the first engaging hook and the second engaged part when the pin part is in the second inserting position.

With the clip according to a fifth aspect of the present disclosure, the cylindrical part in the clip according to the fourth aspect is provided with a third engaging hook in the same direction but in a different position than the first engaging hook, and the pin part is provided with a third engaged part that engages with the third engaging hook when the pin part is in the second inserting position.

With the clip according to the fifth aspect, since the third engaging hook is provided on the cylindrical part in a different position than the first engaging hook in a circumferential direction and the third engaging hook engages with the third engaged part provided on the pin part when the pin part is in the second inserting position, the pin part is further suppressed from coming out of the cylindrical part.

With the clip according to a sixth aspect of the present disclosure, the attaching hole in the clip according to any one of the first to the fifth aspects includes a first region sized to allow insertion of the cylindrical part without elastically deforming the second engaging hook, and a second region adjacent to the first region that is smaller than the first region and sized to allow insertion of the cylindrical part by elastically deforming the engaging hook, where the cylindrical part is relatively rotatable with respect to the pin part with the pin part as the axis, an operating part for rotating the cylindrical part is provided on the female member, and where the second engaging hook is positioned in the second region of the attaching hole and engages with an edge of the second region when the operating part is in a first rotating position, and the second engaging hook is positioned in the first region of the attaching hole and does not engage an edge of the first region when the operating part is in a second rotating position.

With the clip according to the sixth embodiment, when the clip is attached to the attaching member, that is, when the operating part is in the first rotating position and the second engaging hook is positioned in the second region of the attaching hole and engages the edge of the second region, the operating part is rotated from the first rotating position to the second rotating position. The cylindrical part rotates with respect to the pin part and the second engaging hook moves from the second region to the first region of the attaching hole in conjunction with this rotation of the operating part. This disengages the second engaging hook from the edge of the first region of the attaching hole. In this disengaged state, the clip can be removed from the attaching member. Thus, with the clip described above, detachment (removal) from the attaching member is made possible by the simple operation of rotating the operating part.

The clip attaching structure according to a seventh aspect of the present disclosure is equipped with the attaching member in which the attaching hole has been formed, and the clip of any one of the first through the sixth aspects attached to the attaching member.

With a clip using the clip attaching structure according to the seventh aspect, when the pin part is inserted to the first inserting position inside the cylindrical part of the female member while the head part of the male member is being pushed, the pin part and the first engaging hook engage, and the male member and the female member are provisionally assembled. Next, the head part of the male member is pushed and the cylindrical part of the female member is inserted into the attaching hole of the attaching member. Here, when the pin part is in the first inserting position, the tolerance part of the pin part allows elastic deformation of the second engaging hook toward the inside of the cylindrical part, and thus the cylindrical part passes the second engaging hook and is inserted into the attaching hole. After the second engaging hook passes through the attaching hole, the second engaging hook returns elastically, and the second engaging hook engages with an edge of the attaching hole. Furthermore, when the pin part reaches the second inserting position, the second engaging hook is supported from inside the cylindrical part by the stopping part of the pin part, thus stopping the elastic deformation of the second engaging hook toward the inside of the cylindrical part. This holds the female member in the attaching member. Additionally, when the pin part is in the second inserting position, the pin part and the first engaging hook engage and the male member and the female member are assembled (the assembly). In this way, the clip is attached to the attaching member.

Here, with the clip using the clip attaching structure described above, after the male member and the female member are provisionally assembled, the cylindrical part of the female member is inserted into the attaching hole of the attaching part while the head part of the male member is being pushed, which causes the female member to be held in the attaching member, the male member and female member to be assembled (the assembly), and the clip to be attached to the attaching member. That is, since the clip using the clip attaching structure described above can be attached to the attaching member by a single pushing operation, the clip can be attached to the attaching member by a simple operation.

Furthermore, with the clip using the clip attaching structure described above, since the external form of the head part of the male member is made larger than the external form of the female member, pushing the head part is easier than in, for example, a configuration where the external form of the head part is smaller than the external form of the female member, thus making an operation for pushing the pin part in simpler.

With the clip attaching structure according to an eighth aspect of the present disclosure, the attaching member in the clip attaching structure according to the seventh aspect is a vehicle body, and a plurality of the clips of the male members is provided on a holding member that holds a vehicle component to be attached to the vehicle body.

With the clip attaching structure according to the eighth aspects, since the attaching member is a vehicle body and the clip male member is provided on the holding member that holds the vehicle component to be attached to the vehicle body, the vehicle component can be attached to the vehicle body by a simple operation.

Furthermore, since a plurality of the clips of the male member is provided on the holding member, a plurality of clips can be attached to the vehicle body at the same time by a single push operation of the holding member. That is, with the clip attaching structure described above, the operation steps required for the push operation that attaches the clip to the vehicle body can be reduced.

Effect of the Invention

According to the present disclosure, a clip and a clip attaching structure can be provided in which attaching to the attaching member can be accomplished by a simple operation.

BRIEF DESCRIPTION OF THE DRAWINGS

FIG. 15 is a perspective view of a male member forming a clip according to a second embodiment of the present disclosure seen from a pin side.

FIG. 16 is a perspective view of the male member in FIG. 15 seen from a head part side.

FIG. 17 is a side surface view (plan view of the male member in FIG. 16 seen from the direction of Arrow 17) of the male member in FIG. 16.

FIG. 18 is a cross sectional view of the male member in FIG. 16 along line 18-18.

DESCRIPTION OF THE PREFERRED EMBODIMENTS

First Embodiment

Next, a clip and clip attaching structure according to an embodiment of the present disclosure will be described using FIG. 1 through FIG. 14.

Figure 13:
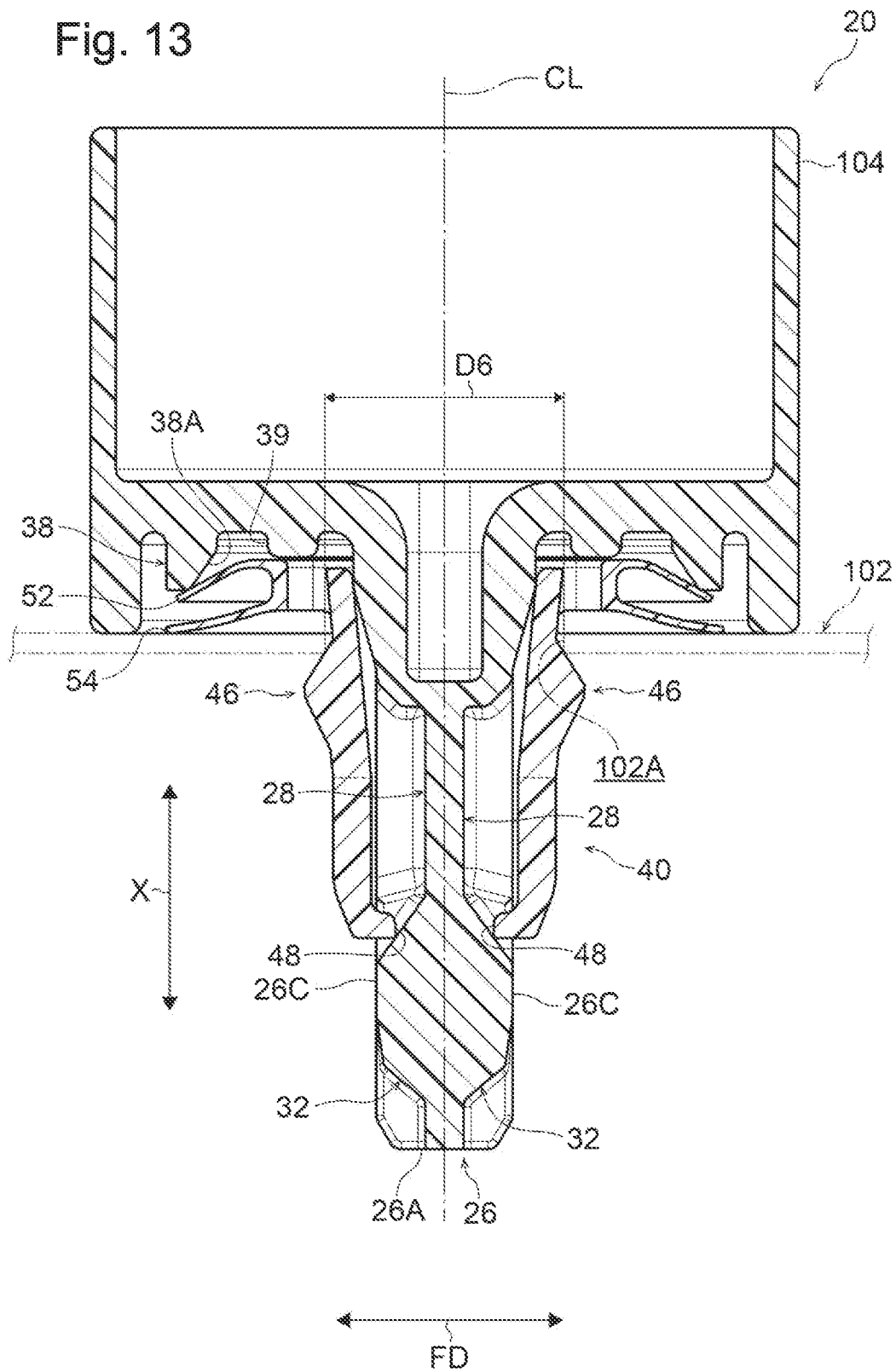
FIG. 13 is a cross sectional view (cross sectional view corresponding to FIG. 11) illustrating the male member and female member in the assembly state.
Figure 14:
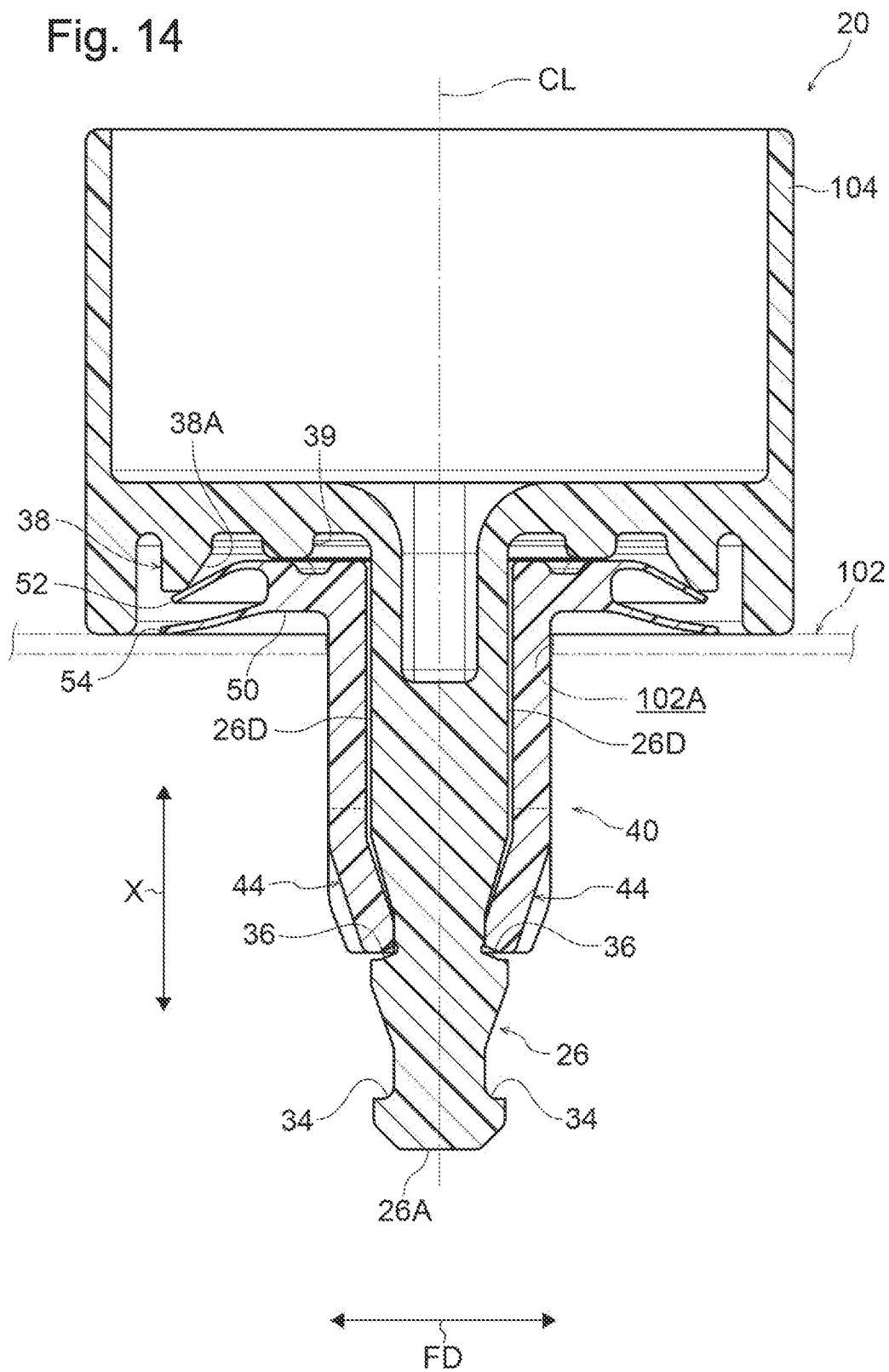
FIG. 14 is a cross sectional view (cross sectional view corresponding to FIG. 12) illustrating the male member and female member in the assembly state.

Clip 20 of the present embodiment is a member used to attach a vehicle component not shown in the figures to a vehicle body 102, as illustrated in FIG. 13 and FIG. 14. Note that the vehicle component referred to here indicates, for example, a bumper. Furthermore, the vehicle body referred to here indicates, for example, and body panel. Note that the vehicle body 102 of the present embodiment is one example of an attaching member according to the present disclosure.

The clip 20 is provided with a male member 22 formed of resin and a female member 40 also formed of resin. Here, in the present embodiment, the male member 22 is provided integrally with a retainer 104 in order to hold the vehicle component on the vehicle body 102. Note that the retainer 104 of the present embodiment is one example of a holding member according to the present disclosure.

Figure 1:
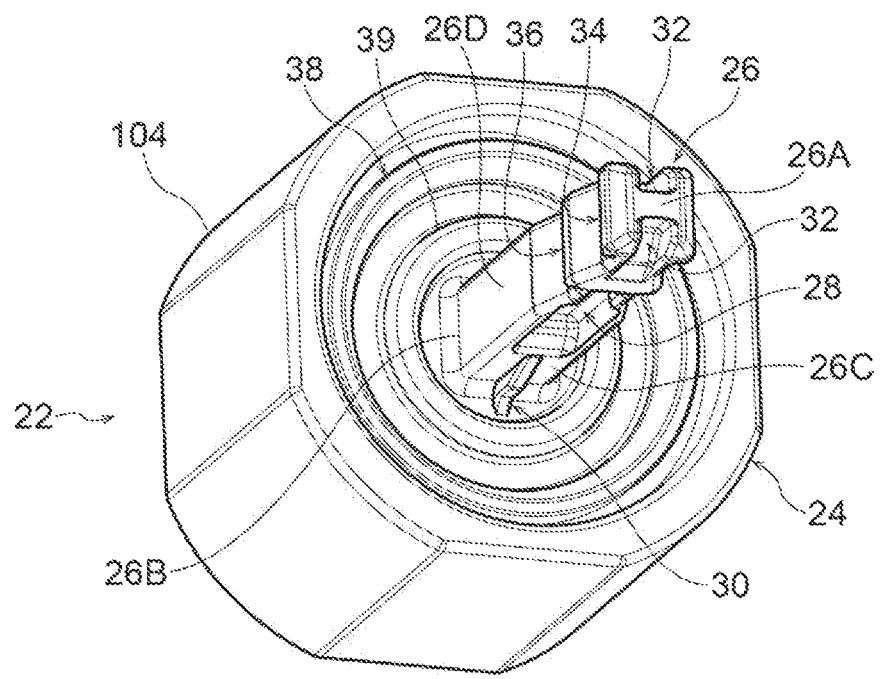
FIG. 1 is a perspective view of a male member forming a clip according to a first embodiment of the present disclosure seen from a pin side.
Figure 2:
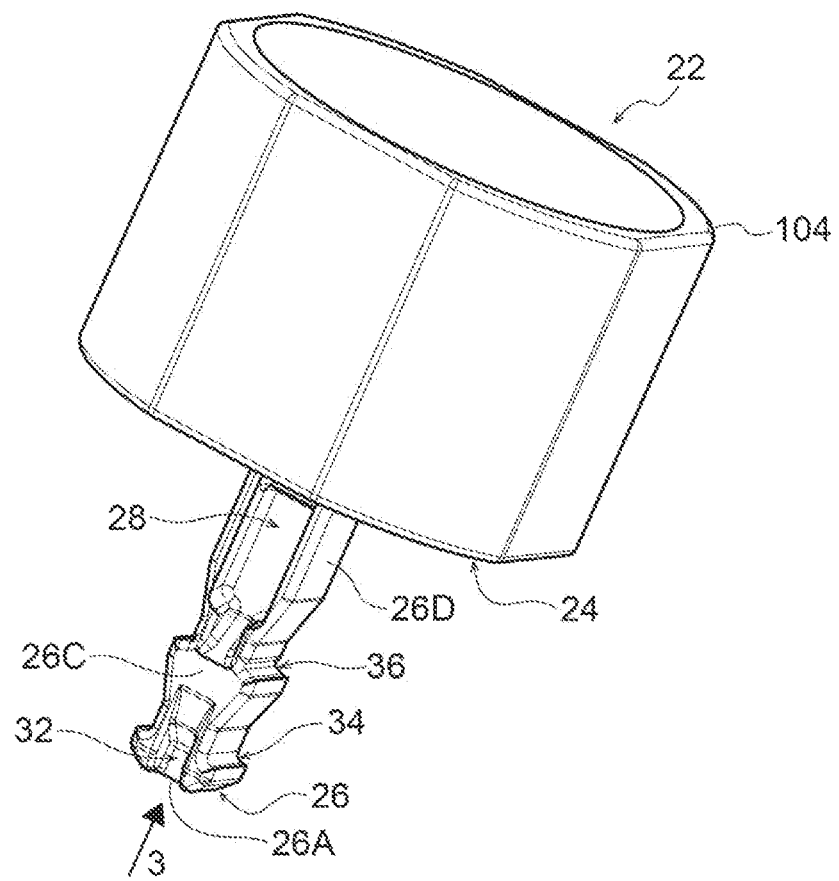
FIG. 2 is perspective view of the male member in FIG. 1 seen from a head part side.

As is illustrated in FIG. 1 and FIG. 2, the male member 22 is provided integrally with the retainer 104, as is described above, and includes a head part 24 and a pin part 26.

Figure 4:
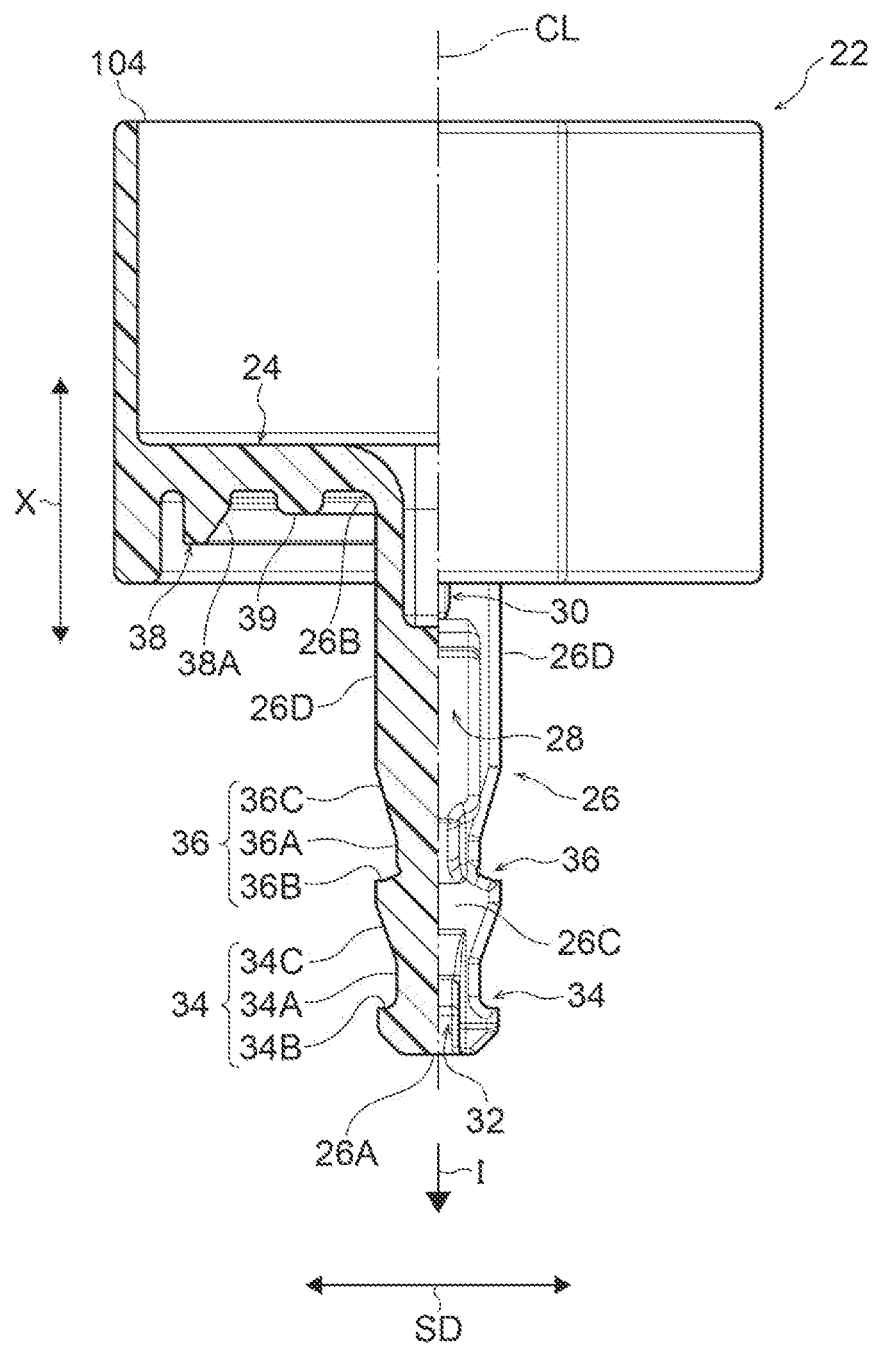
FIG. 4 is a cross sectional view of the male member in FIG. 3 along line 4-4.

As is illustrated in FIG. 4, the head part 24 is a flat plate-like part formed on the retainer 104. Furthermore, as is illustrated in FIG. 11 and FIG. 12, an external form of the head part 24 is larger than an external form of the female member 40.

A cross sectional shape of the pin part 26 is approximately square and rod-shaped, and, as is illustrated in FIG. 4, protrudes from the head part 24 in a thickness direction of the head part 24. Note that, in the present embodiment, an axial direction of the pin part 26 is the same as the thickness direction of the head part 24. Furthermore, the axial direction of the pin part 26 is described below as appropriate axial direction X.

As illustrated in FIG. 1 and FIG. 2, a tolerance part 28 and a stopping part 30 are provided, respectively, on a pair of facing side walls 26C in a first direction (direction FD in FIG. 3) orthogonal to the axial direction of the pin part 26 between one end part 26A (in other words, a protruding direction front end part of the pin part 26) positioned on one side (lower side in FIG. 4) of the pin part 26 in the axial direction X and another end part 26B (in other words, a protruding direction base end part of the pin part 26) positioned on another side (upper side in FIG. 4). Specifically, as is illustrated in FIG. 1 and FIG. 11, the tolerance part 28 is provided on the one end part 26A side of the pin part 26, and the stopping part 30 is provided more toward the other end part 26B side of the pin part 26 than the tolerance part 28.

Figure 11:
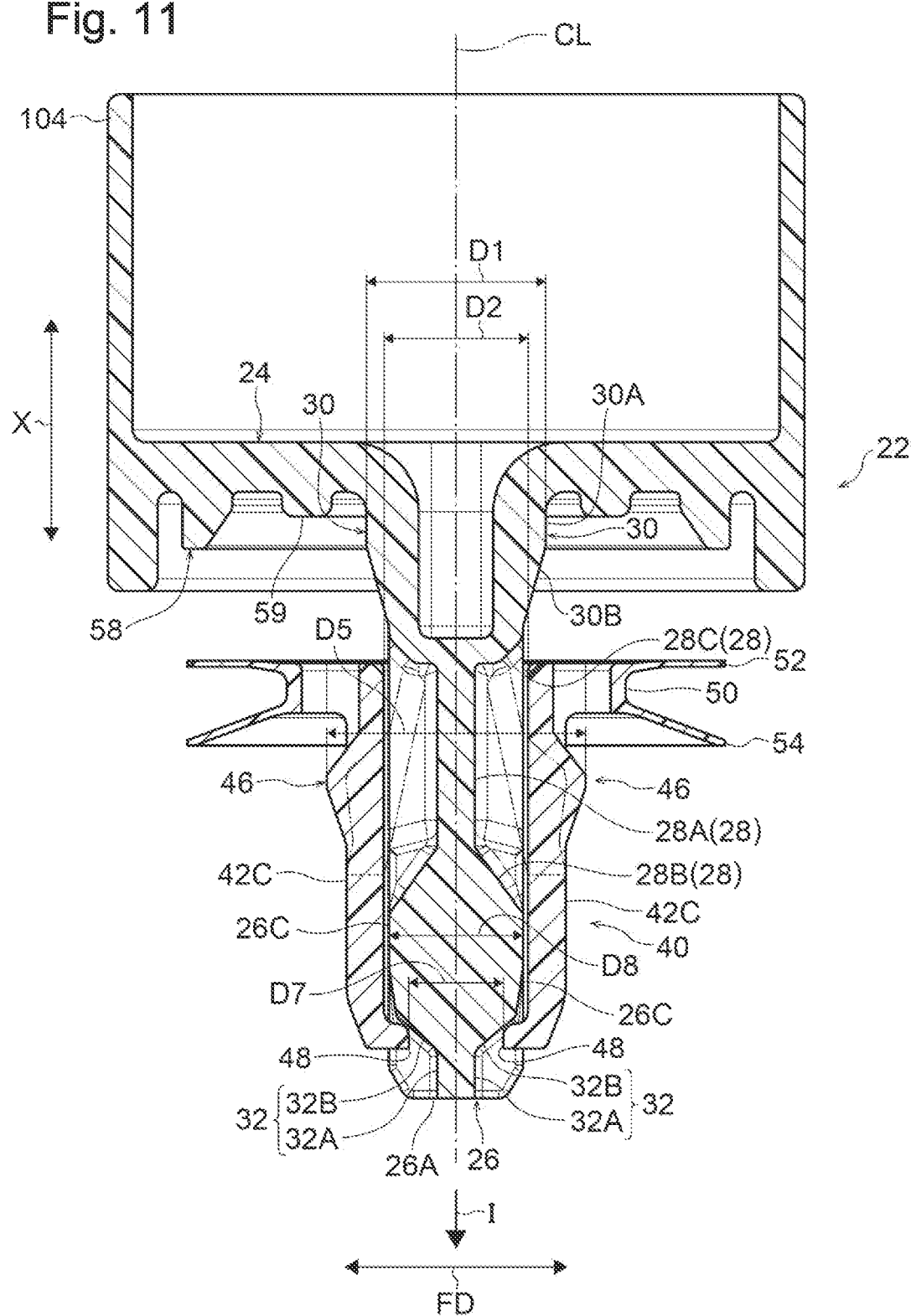
FIG. 11 is a cross sectional view (cross sectional view along a first direction) illustrating the male member and female member in a provisionally assembled state.
Figure 12:
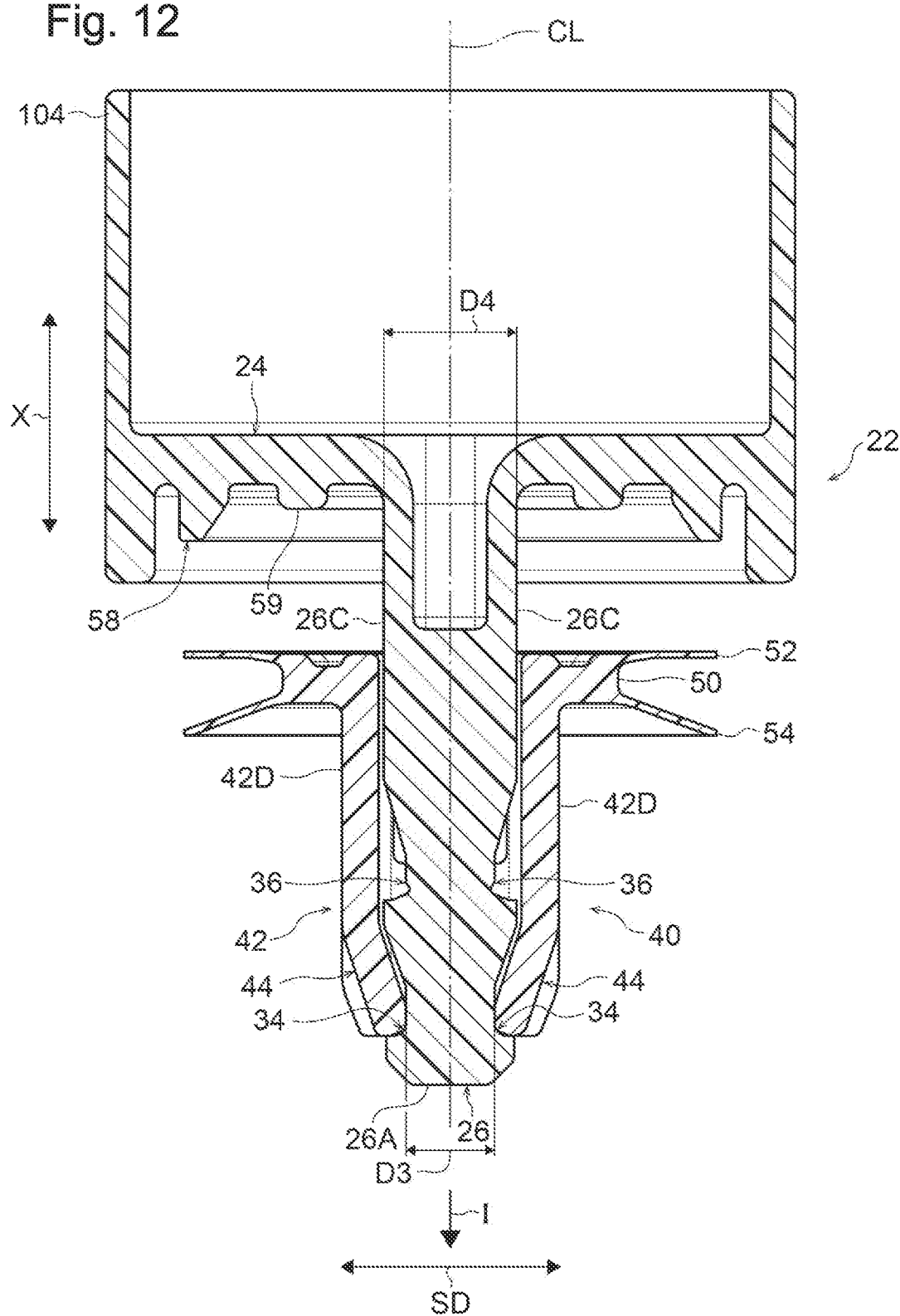
FIG. 12 is a cross sectional view (cross sectional view along a second direction) illustrating the male member and female member in a provisionally assembled state.

As is illustrated in FIG. 1, the tolerance part 28 is a concave-shaped portion provided in the side wall 26C of the pin part 26, and, as is illustrated in FIG. 11, a portion that allows elastic deformation of an engaging hook 46, to be described below, of the female member 40 toward an inside of a cylindrical part (in other words, inside of a cylindrical part 42). Note that, in FIG. 11, a state of elastic deformation of the engaging hook 46 is illustrated by a dashed line. Here, elastic deformation of the engaging hook 46 toward the inside of the cylindrical part means that the engaging hook 46 of the male member 22 is elastically deformed toward an axial center AL side of the cylindrical part 42 of the female member 40. Note that elastic deformation of the engaging hook 46 toward an outside of the cylindrical part means that the engaging hook 46 of the male member 22 is elastically deformed toward a side opposite the axial center AL side of the cylindrical part 42 of the female member 40.

As is illustrated in FIG. 11 and FIG. 13, the tolerance part 28 is formed of a bottom part 28A and a pair of wall parts 28B and 28C on either side of the bottom part 28A in the axial direction X. In the present embodiment, the bottom part 28A is a flat surface extending along the axial direction X, and the wall part 28B on one side in the axial direction X extends in an inclined manner from one end part (end part on one side) of the bottom part 28A in the axial direction X toward the one end part 26A side (that is, one side in the axial direction X) of the pin part 26. Meanwhile, the wall part 28C on the other side in the axial direction X extends along the first direction FD from another end part (end part on the other side) of the bottom part 28A in the axial direction X toward a surface of the side wall 26C, and, mid-way, extends in an inclined manner toward the other end part 26B side (that is, the other side in the axial direction X) of the pin part 26. Note that the wall part 28B that forms the tolerance part 28 of the present embodiment is one example of the third engaged part according to the present disclosure.

Meanwhile, as illustrated in FIG. 1, the stopping part 30 is a rising portion (in the present embodiment, a portion protruding from the surface of the side wall 26C) provided on the pin part 26, and thus a portion that supports the engaging hook 46 from inside the cylindrical part and stops the elastic deformation of the engaging hook 46 toward the inside of the cylindrical part.

As illustrated in FIG. 11 and FIG. 13, the stopping part 30 is formed of a top part 30A and an inclined wall part 30B. In the present embodiment, the top part 30A is a flat surface extending along the axial direction X. Furthermore, one end part of the top part 30A in the axial direction X is connected to the inclined wall part 30B, and another end part thereof in the axial direction is connected to the head part 24. Additionally, as illustrated in FIG. 11, a distance D1 between a pair of top parts 30A of the stopping part 30 facing each other in the first direction FD is longer than a distance D2 between inner surfaces (inner surfaces of a linear part 46A) of the engaging hook 46 in an unloaded state. Moreover, in the present embodiment, the inclined wall part 30B is connected to the top part 30A and the wall part 28C of the tolerance part 28, and is an inclined surface extending in an inclined manner from an end part on the other side of the wall part 28C in the axial direction toward the top part 30A in a direction that moves away from an axial center CL of the pin part 26.

Furthermore, as illustrated in FIG. 1, a recessed part 32, though which an engaging hook 48, described below, of the female member 40 passes, is provided on the pair of side walls 26C of the pin part 26. As illustrated in FIG. 11 and FIG. 13, this recessed part 32 is provided with a bottom part 32A and an inclined wall part 32B. The bottom part 32A is a flat surface extending along the axial direction X. Additionally, the inclined wall part 32B is an inclined surface that extends in an inclined manner from an end part on the other side of the bottom part 32A in the axial direction X in a direction that moves away from the axial center CL of the pin part 26.

Moreover, as illustrated in FIG. 1 and FIG. 2, an engaging concave part 34 and an engaging concave part 36, respectively, are provided between the one end part 26A and the other end part 26B of the pin part 26 in the axial direction X on a pair of side walls 26D facing each other in a second direction (direction SD in FIG. 3) orthogonal to both the axial direction X of the pin part 26 and the first direction FD. Specifically, as illustrated in FIG. 2 and FIG. 4, the engaging concave part 34 is provided on the one end part 26A side of the pin part 26, and the engaging concave part 36 is provided more toward the other end part 26B side of the pin part 26 than the engaging concave part 34. Note that the engaging concave part 34 according to the present embodiment is one example of the first engaged part according to the present disclosure and the engaging concave part 36 according to the present embodiment is one example of the second engaged part according to the present disclosure.

As illustrated in FIG. 4 and FIG. 12, the engaging concave part 34 is a concave-shaped portion provided in the side wall 26D of the pin part 26, and is a portion with which an engaging hook 44 engages as one example of a first engaging hook, described below, of the female member 40. This engaging concave part 34 is formed of a bottom part 34A and a pair of wall parts 34B and 34C on either side of the bottom part 34A in the axial direction X. In the present embodiment, the bottom part 34A is a flat surface extending along the axial direction X. Furthermore, the wall part 34B on one side in the axial direction X is a flat surface extending in along the second direction SD from one end part (end part on one side) of the bottom part 28A in the axial direction X toward the surface of the side wall 26D. Furthermore, a root portion of the wall part 34B is curved in an arc. Additionally, the wall part 34C on the other side in the axial direction X extends from the other end part (end part on the other side) of the bottom part 34A in the axial direction X toward the other end part 26B side (that is, the other side in the axial direction X) of the pin part 26.

As illustrated in FIG. 4 and FIG. 12, the engaging concave part 36 is a concave-shaped portion provided in the side wall 26D of the pin part 26, and is a portion with which the engaging hook 44 of the female member 40 engages. This engaging concave part 36 is formed of a bottom part 36A and a pair of wall parts 36B and 36C on either side of the bottom part 36A in the axial direction X. In the present embodiment, the bottom part 36A is a flat surface extending along the axial direction X. Furthermore, the wall part 36B on one side in the axial direction X is a flat surface extending in an inclined manner with respect to the second direction SD from one end part (end part on one side) of the bottom part 36A in the axial direction X toward the surface of the side wall 26D. Additionally, the wall part 36C on the other side in the axial direction X extends from another end part (end part on the other side) of the bottom part 36A in the axial direction X toward the other end part 26B side (that is, the other side in the axial direction X) of the pin part 26.

Figure 3:
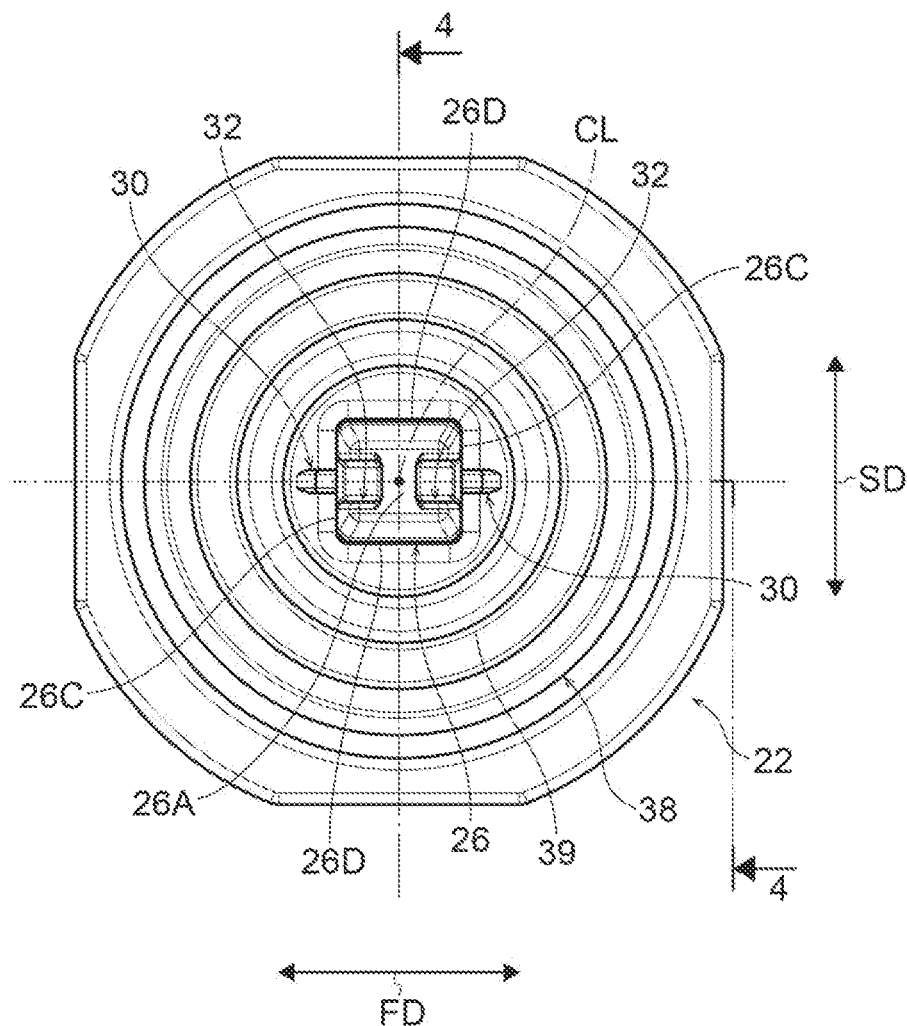
FIG. 3 is a bottom surface view (plan view seen from the direction of Arrow 3 in FIG. 2) of the male member in FIG. 1 seen from the pin side.

As is illustrated in FIG. 1, FIG. 3, and FIG. 11, a circular convex part 38 that surrounds the pin part 26 is provided on the head part 24. As illustrated in FIG. 4 and FIG. 11, this circular convex part 38 is a circular convex portion protruding from a surface on the pin part 26 side of the head part 24 along the axial direction X. Furthermore, a radial direction inner corner on the circular convex part 38 is formed into a tapered surface 38A. As illustrated in FIG. 13 and FIG. 14, a seal part 52, described below, of the female member 40 is made to make contact with this circular convex part 38.

Furthermore, as illustrated in FIG. 1, FIG. 3, and FIG. 11, a circular convex part 39 that surrounds the pin part 26 is provided on the head part 24 further inward in a radial direction than the circular convex part 38. A protrusion height of this circular convex part 39 is lower than that of the circular convex part 38. As illustrated in FIG. 13 and FIG. 14, because this circular convex part 39 makes contact with a flange part 50, described below, of the female member 40, the male member 22 can be prevented from being inserted too far with respect to the female member 40.

Figure 5:
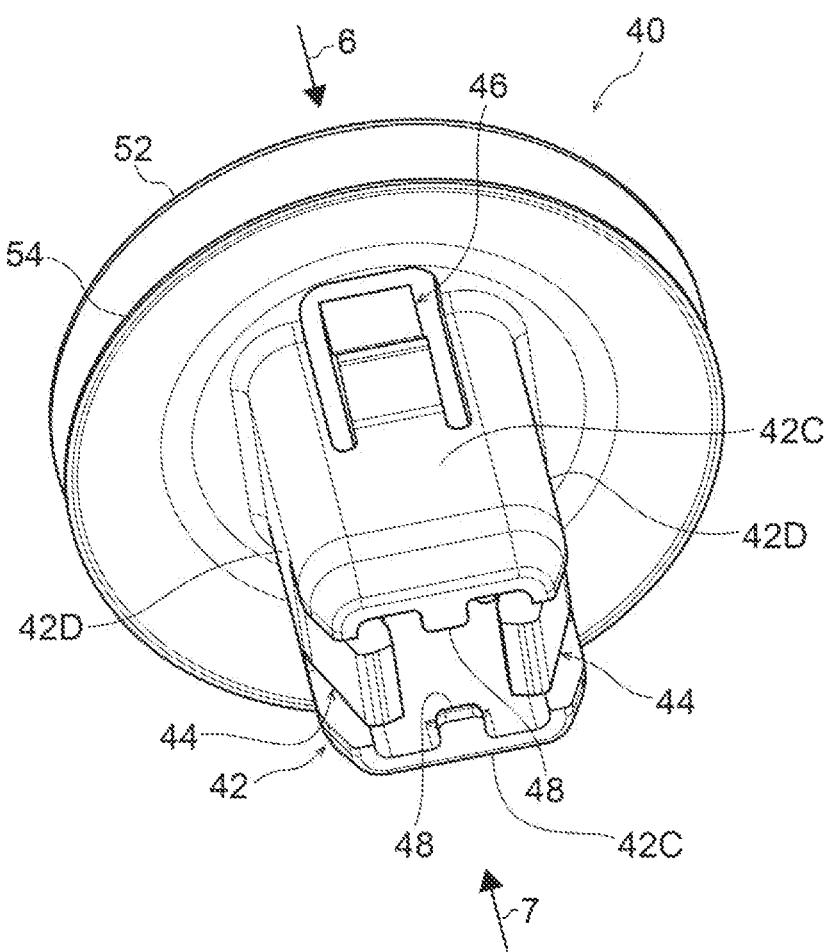
FIG. 5 is a perspective view of a female member forming a clip according to the first embodiment of the present disclosure seen from a cylindrical part side.

As illustrated in FIG. 5, the female member 40 includes the cylindrical part 42, the engaging hook 44, and the engaging hook 46. Note that the engaging hook 44 according to the present embodiment is the first engaging hook according to the present disclosure and the engaging hook 46 according to the present embodiment is the second engaging hook according to the present disclosure.

Figure 6:
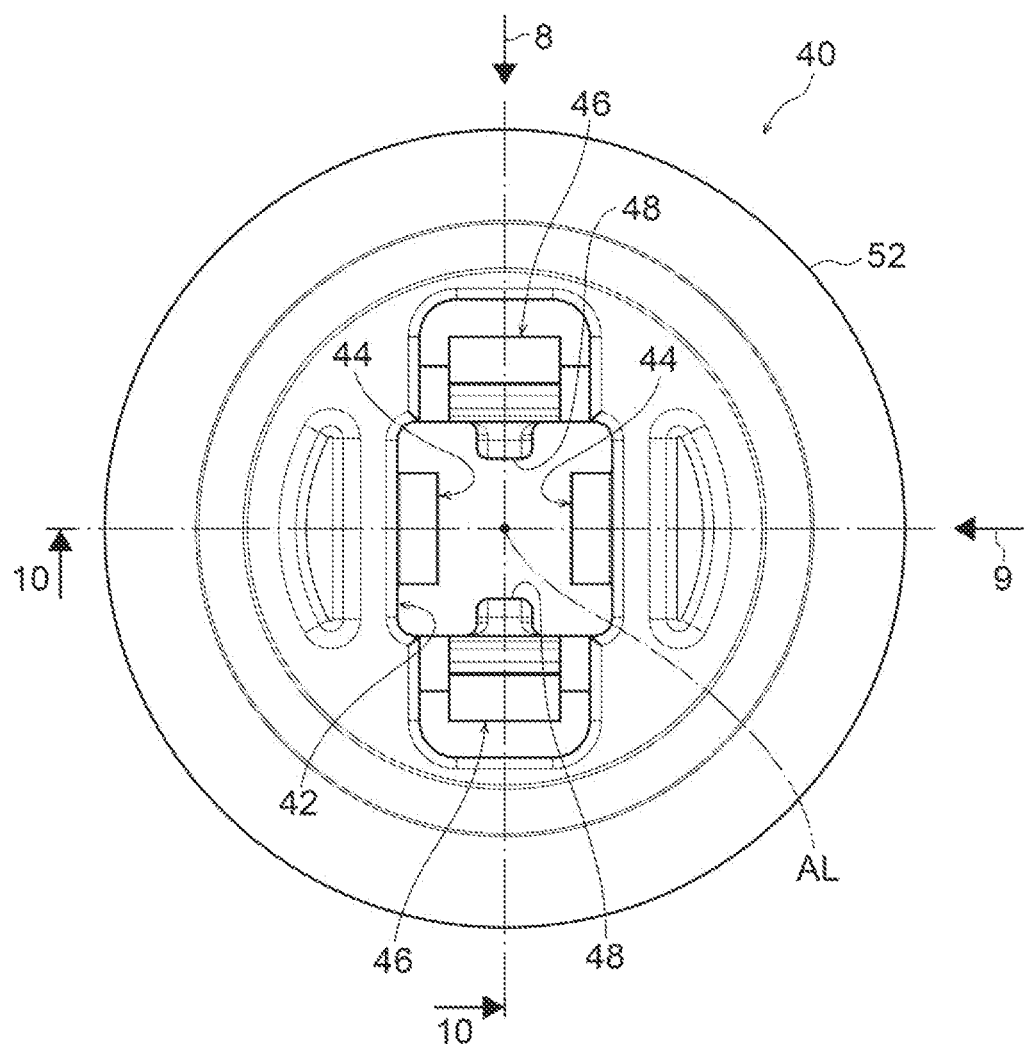
FIG. 6 is a bottom surface view (plan view of the female member in FIG. 5 seen from the direction of Arrow 6) of the female member in FIG. 5.
Figure 7:
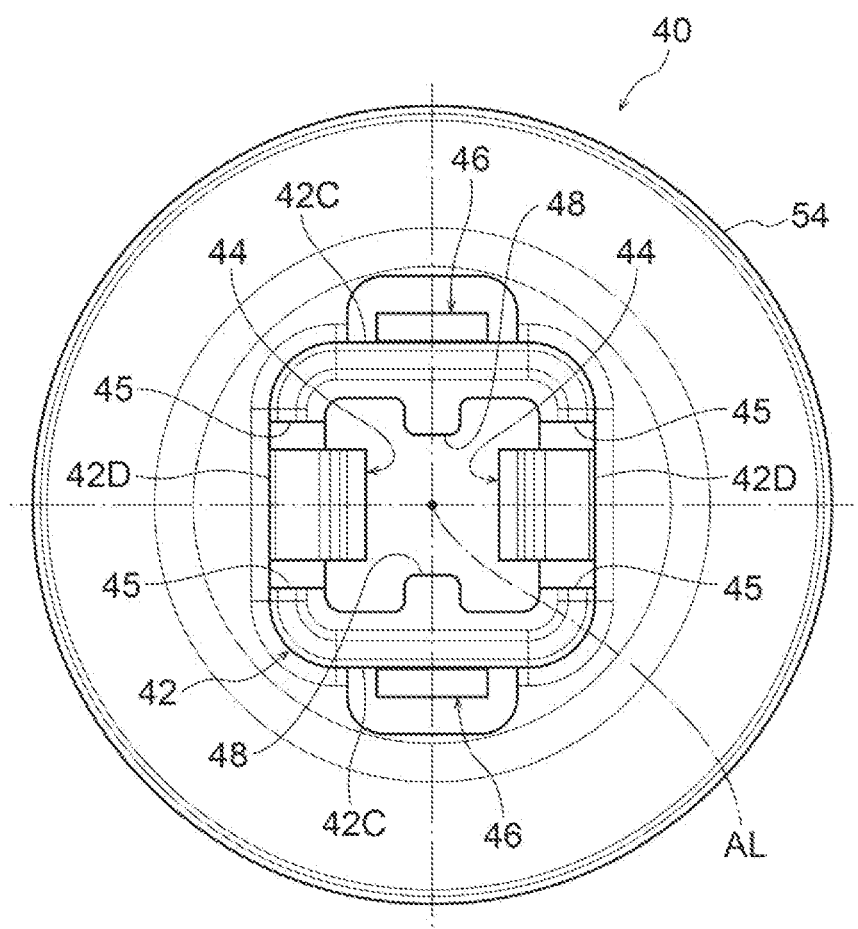
FIG. 7 is a bottom surface view (plan view of the female member in FIG. 5 seen from the direction of Arrow 7) of the female member in FIG. 5.

As is illustrated in FIG. 5 through FIG. 7, the cylindrical part 42 is a square cylinder with a substantially quadrangular cross-sectional shape and is designed so that the pin part 26 of the male member 22 is inserted inside thereof. That is, an internal form of the cylindrical part 42 is shaped to correspond to an external form of the male member 22. Furthermore, the cylindrical part 42 is made to be inserted into an attaching hole 102A formed in the vehicle body 102. Note that the attaching hole 102A according to the present embodiment is a through hole with an essentially regular quadrangular shape (specifically, a regular quadrangle with rounded corners). Furthermore, hereinafter, a cylinder axial direction of the cylindrical part 42 will be illustrated using the symbol Y and an axial center of the cylindrical part 42 will be illustrated using the symbol AC. Note that, since an axial center CL of the pin part 26 of the male member 22 and an axial center AL of the cylindrical part 42 of the female member 40 approximately match when the male member 22 and the female member 40 are in an assembled state, only the axial center CL and the axial direction X are illustrated in, and the axial center AL and the cylinder axial direction Y are omitted from the drawings (that is, FIG. 11 through FIG. 14) that illustrate assembled states.

As illustrated in FIG. 12, with the male member 22 and the female member 40 in an assembled state (including provisional assembly and the assembly), the engaging hook 44 is provided on each of a pair of side walls 42D facing a pair of the side walls 26D of the pin part 26, respectively. This engaging hook 44 is a plate-like portion formed between two slits 45 that extend, with respect to the side wall 42D, from a one end part 42A on one side (lower side in FIG. 9 and FIG. 10) of the cylindrical part 42 in the cylinder axial direction toward another end part 42B side (in other words, another side (upper side in FIG. 9 and FIG. 10) in the cylinder axial direction Y), and is elastically deformable. As is illustrated in FIG. 10, another end part (end part on another side) of this engaging hook 44 is a fixed end connected to the side wall 42D, and one end part (end part on one side) thereof in the cylinder axial direction Y is supported in a cantilevered state as a free end. Furthermore, this engaging hook 44 includes a linear part 44A extending along the cylinder axial direction Y from another end part in the cylinder axial direction Y and a hook part 44B extending in an inclined manner from the linear part 44A toward the inside of the cylindrical part. As illustrated in FIG. 12, a distance D3 between tip end part inner surfaces of the hook part 44B of the engaging hook 44 provided on each of the pair of side walls 42D is shorter than the distance D4 between the outer surfaces of the pair of side walls 26D of the pin part 26 in an unloaded state. Therefore, as illustrated in FIG. 12 and FIG. 14, when the tip end part of the hook part 44B is inserted into the engaging concave part 34 of the male member 22, the engaging hook 44 engages with the engaging concave part 34, and when inserted into engaging concave part 36, the engaging hook 44 engages with the engaging concave part 36.

Here, an inserting position (inserting position in FIG. 11 and FIG. 12) of the pin part 26, when, as illustrated in FIG. 12, the pin part 26 is inserted into the cylindrical part 42 and the engaging hook 44 is engaged with the engaging concave part 34, is referred to as a first inserting position, and an inserting position (inserting position in FIG. 13 and FIG. 14) of the pin part 26, when, as illustrated in FIG. 14, the pin part 26 is inserted further to the back of the cylindrical part 42 than the first inserting position and the engaging hook 44 is engaged with the engaging concave part 36, is referred to as a second inserting position.

As illustrated in FIG. 11, with the male member 22 and the female member 40 in an assembled state (including provisional assembly and the assembly), the engaging hook 46 is provided on each of a pair of side walls 42C facing the pair of the side walls 26C of the pin part 26, respectively. This engaging hook 46 is a plate-like portion formed between two slits 47 that extend, with respect to the side wall 26C, from another end part 42B of the cylindrical part 42 in the cylinder axial direction toward the one end part 42A side, and is elastically deformable. As illustrated in FIG. 10, another end part (end part on another side) of this engaging hook 46 is a fixed end connected to the side wall 42D, and one end part (end part on one side) thereof in the cylinder axial direction Y is supported in a cantilevered state as a free end. Furthermore, this engaging hook 46 includes a linear part 46A extending along the cylinder axial direction Y from the one end part in the cylinder axial direction Y and a hook part 46B that is a convex part protruding in a direction that moves away from the axial center AL from an outer surface of the linear part 46A. A cross sectional shape of this hook part 46B is a mountain-like shape that includes a top part 46B1 and an inclined part 46B2 connected on either side of the top part 46B1. Furthermore, as illustrated in FIG. 11, a distance D5 between a tip end part (that is, the top part 46B1) of the hook part 46B of the engaging hook 46 provided on each of the pair of side walls 42C is longer than a distance D6 of the attaching hole 102A of the vehicle body 102 in an unloaded state. Therefore, as illustrated in FIG. 13, after the hook part 46B of the elastically deformed engaging hook 46 has passed through the attaching hole 102A of the vehicle body 102, the linear part 46A returns elastically and the hook part 46B engages with the edge of the attaching hole 102A.

Note that, with the present embodiment, the pin part 26 is formed so that, as illustrated in FIG. 11, the tolerance part 28 is positioned inside a cylindrical part of the engaging hook 46 when the pin part 26 is in the first inserting position, and so that, as illustrated in FIG. 13, the stopping part 30 is positioned inside the cylindrical part of the engaging hook 46 when the pin part 26 is in the second inserting position. Therefore, as illustrated in FIG. 11, since the tolerance part 28 is positioned inside the cylindrical part when the pin part 26 is in the first inserting position, the engaging hook 46 is allowed to elastically deform toward the inside of the cylindrical part (see the dashed line in FIG. 11). Furthermore, as illustrated in FIG. 13, since the stopping part 30 is positioned inside the cylindrical part 42 when the pin part 26 is in the second inserting position, the hook is supported from inside the cylindrical part 42 by the stopping part 30 and thus prevented from elastically deforming toward the inside of the cylindrical part 42.

Furthermore, as illustrated in FIG. 5, an engaging hook 48 is provided on the cylindrical part 42 in a different position than the engaging hook 44 in a circumferential direction. Specifically, this engaging hook 48 is provided on a tip end part of the side wall 42C of the cylindrical part 42. Note that the tip end part of the side wall 42C forms the one end part 42A of the cylindrical part 42 in the cylinder axial direction Y. This engaging hook 48 is a convex part protruding from the center of the tip end part of the side wall 42C toward the axial center AL. Furthermore, as illustrated in FIG. 11, a distance D7 between the tip end parts of the engaging hooks 48 provided on the pair of side walls 42C is shorter than a distance D8 between the outer surfaces of the pair of side walls 26C on the pin part 26. Furthermore, as illustrated in FIG. 11, the engaging hook 48 is positioned in a groove part 32 when the pin part 26 is in the first inserting position, and, as illustrated in FIG. 13, in the tolerance part 28 when the pin part 26 is in the second inserting position. Note that when the pin part 26 is moved in a removal direction with respect to the cylindrical part 42, the tip end part of the engaging hook 48 makes contact with a wall part 28B of the tolerance part 28 and limits movement in the removal direction.

Figure 8:
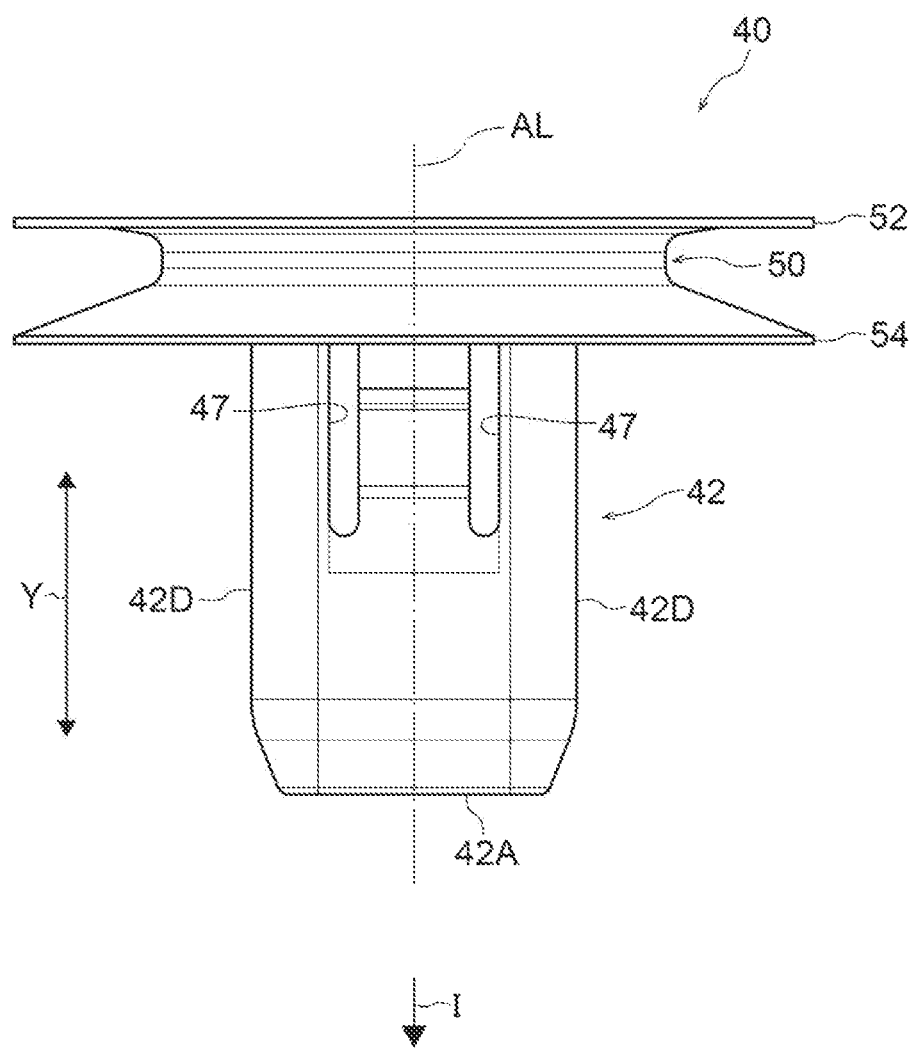
FIG. 8 is a side surface view (side surface view of the female member in FIG. 6 seen from the direction of Arrow 8) of the female member in FIG. 6.
Figure 9:
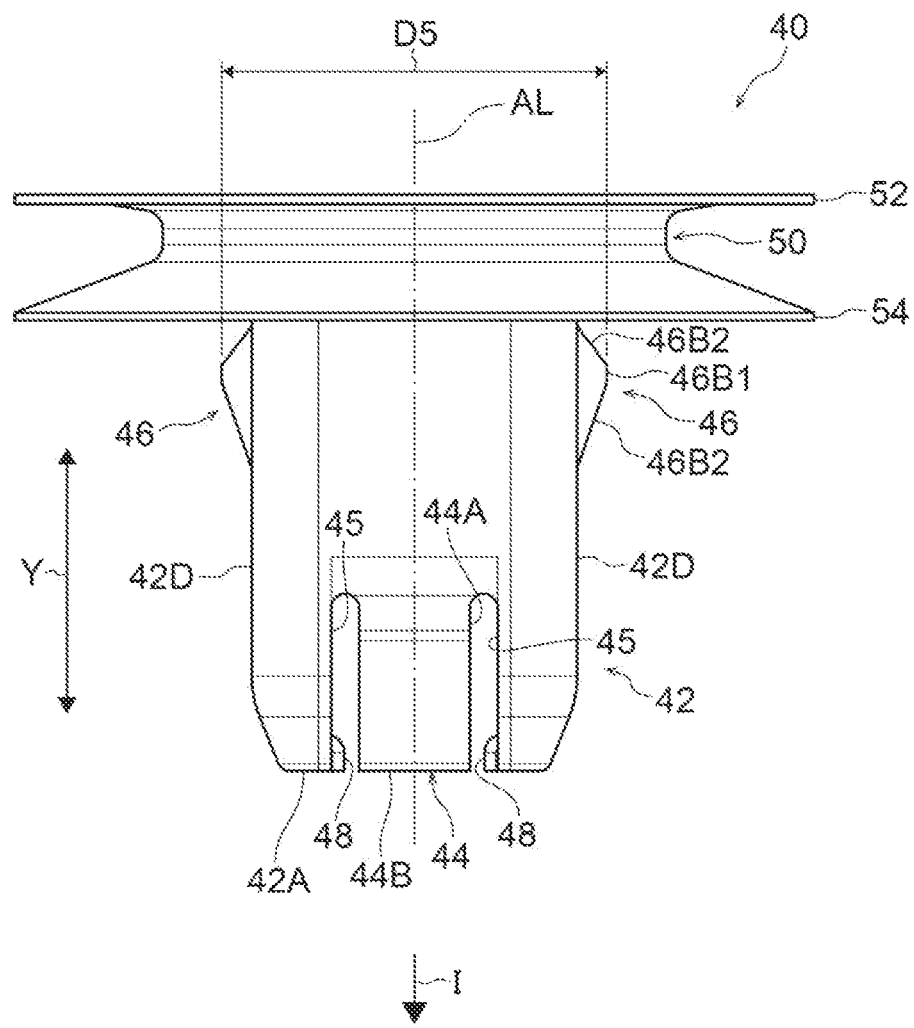
FIG. 9 is a side surface view (side surface view of the female member in FIG. 6 seen from the direction of Arrow 9) of the female member in FIG. 6.
Figure 10:
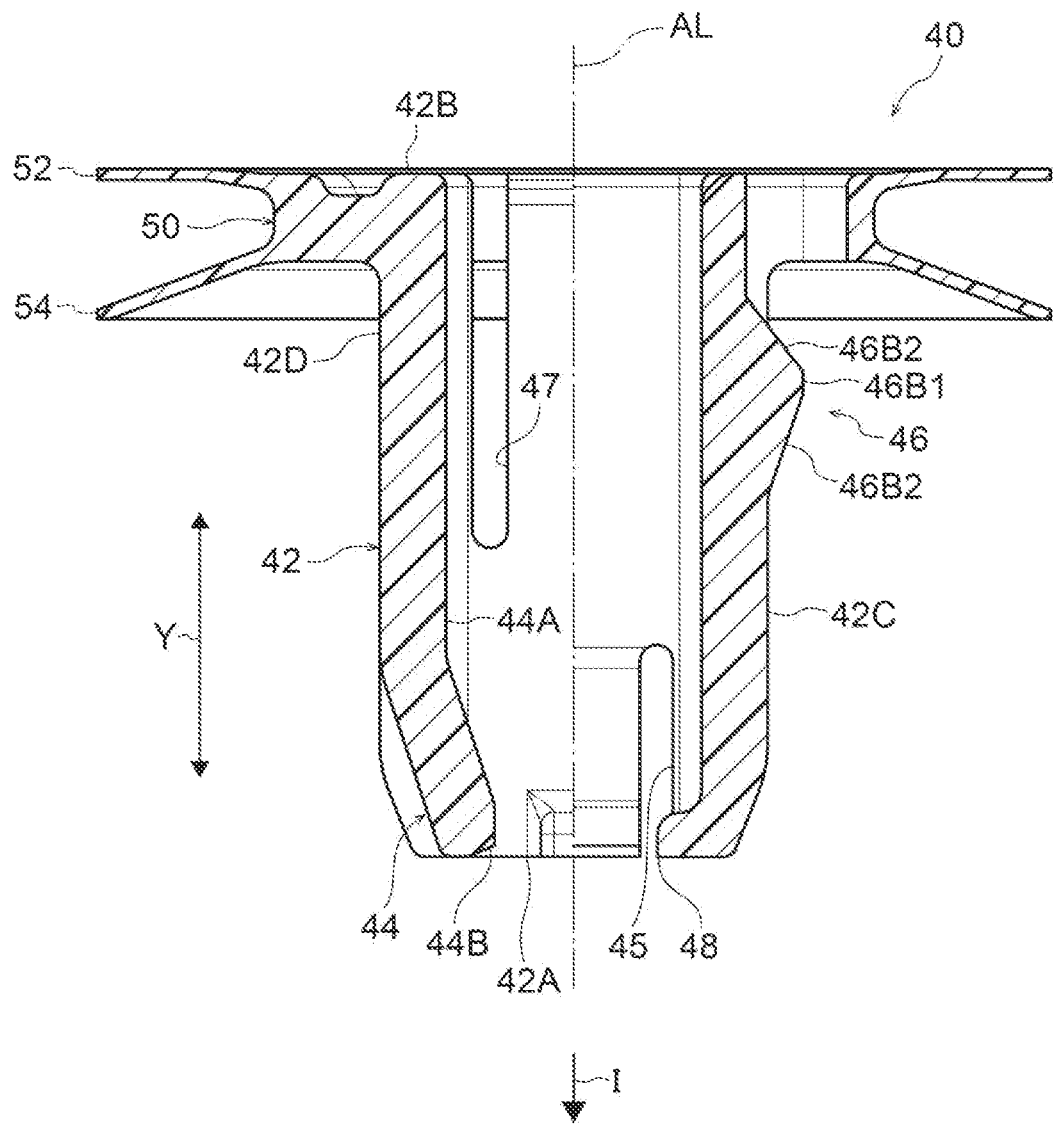
FIG. 10 is a cross sectional view of the male member in FIG. 6 along line 10-10.

Furthermore, as illustrated in FIG. 8 and FIG. 9, the female member 40 includes a flange part 50, a seal part 52, and a seal part 54. Note that the seal part 52 according to the present embodiment is one example of the first seal part according to the present disclosure and the seal part 54 according to the present embodiment is one example of the second seal part according to the present disclosure.

As illustrated in FIG. 8 through FIG. 10, the flange part 50 is a circular portion that overhangs from another end part 42B of the cylindrical part 42 in a direction orthogonal to the cylinder axial direction Y.

As illustrated in FIG. 8 and FIG. 9, the seal part 52 is a portion that overhangs from an outer circumference of the flange part 50, and, as illustrated in FIG. 6 and FIG. 7, a circular portion that is thinner than the flange part 50. This seal part 52 is made to be elastically deformable, and thus makes contact with the circular convex part 38 (to be precise, the tapered surface 38A) and forms a seal between the male member 22 and the female member 40 when the pin part 26 is in the second inserting position.

As illustrated in FIG. 8 and FIG. 9, the seal part 54 is a portion that overhangs from the outer circumference of the flange part 50, and, as illustrated in FIG. 6 and FIG. 7, a circular portion that is thinner than the flange part 50. Note that the seal part 54 is positioned more to one side (the one end part 42A side of the cylindrical part 42) in the cylinder axial direction Y than the seal part 52. This seal part 54 is made to be elastically deformable and thus makes contact with the peripheral part of the attaching hole 102A and forms a seal between the female member 40 and the vehicle body 102 when the cylindrical part 42 is inserted into the attaching hole 102A.

Note that an inserting direction for inserting the pin part 26 of the male member 22 into the cylindrical part 42 of the female member 40, which is a direction along the axial direction X, is illustrated by the symbol I. Furthermore, since an inserting direction for inserting the cylindrical part 42 of the female member 40 into the attaching hole 102A of the vehicle body 102 is a direction along the cylinder axial direction Y and the same as the inserting direction for inserting the pin part 26 into the cylindrical part 42, as described above, the same symbol I will be used therefor.

Furthermore, the clip attaching structure according to the present embodiment is formed of the vehicle body 102 in which the attaching hole 102A is formed and the clip 20 attached to the vehicle body 102.

A method for manufacturing the male member 22 and the female member 40 that form the clip 20 according to the present embodiment will be described next. First, a die 200 for manufacturing the male member 22 of the clip 20 will be described, then, a method for manufacturing the male member 22 will be described. Next, a die 210 for manufacturing the female member 40 will be described, then, a method for manufacturing the female member 40 will be described.

Figure 30:
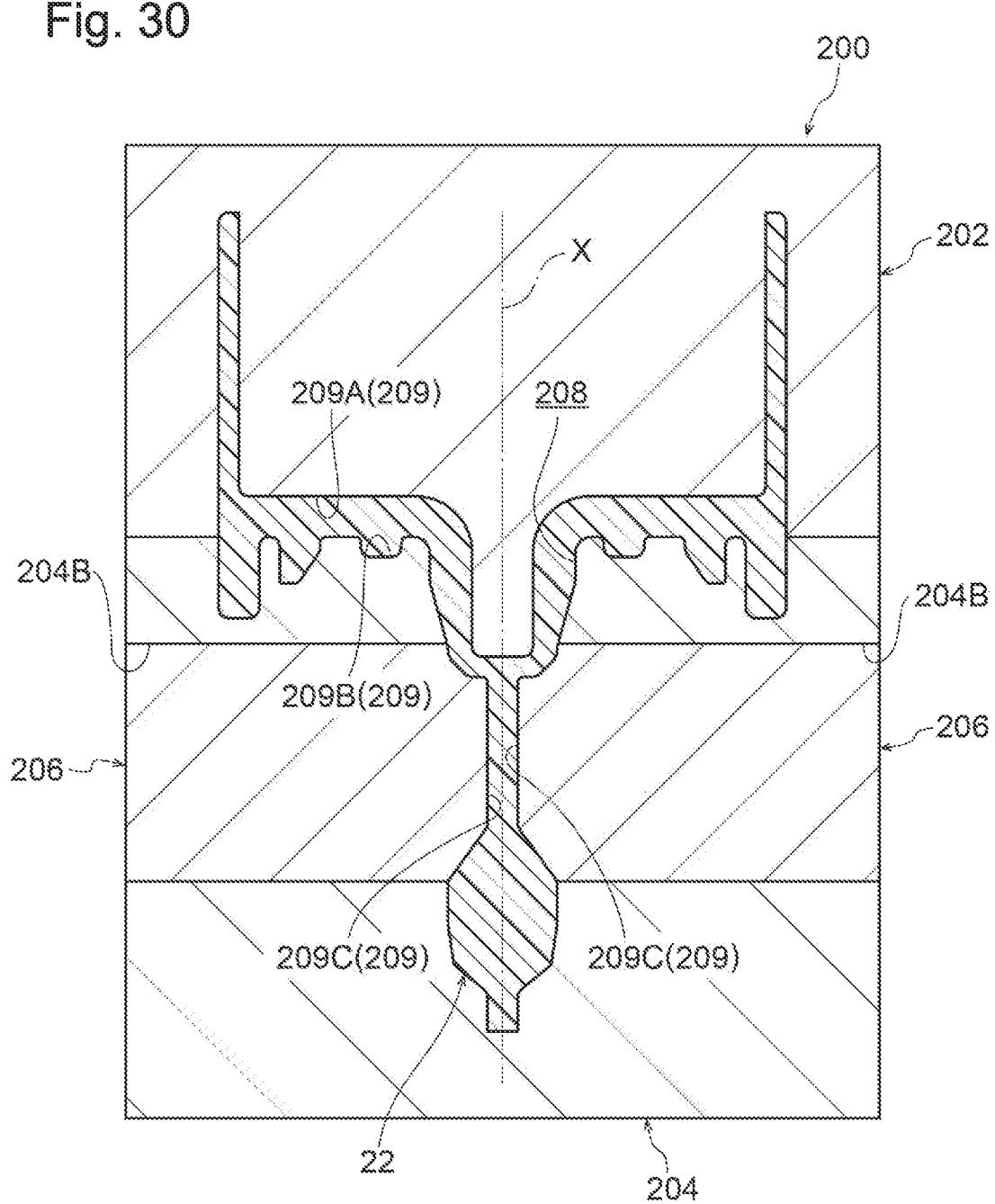
FIG. 30 is a die cross sectional view (die cross sectional view corresponding to a cross section of the male member illustrated in FIG. 13) illustrating a method for manufacturing a male member for forming a clip according to the first embodiment.

As illustrated in FIG. 30, the die 200 used to manufacture the male member 22 is provided with a fixed die 202, a movable die 204, and a sliding die 206. The fixed die 202, the movable die 204, and the sliding die 206 are used to form a cavity 208 for forming the male member 22.

The fixed die 202 is a convex die (a so-called core). A molding surface 209A that forms part of a molding surface 209 for molding the male member 22, which is a wall surface that molds the cavity 208, is provided in this fixed die 202.

The movable die 204 is a concave die (a so-called cavity). A molding surface 209B that forms a different part of the molding surface 209 than the molding surface 209A is provided in this movable die 204. Furthermore, a direction for opening and closing the movable die 204 and the fixed die 202 is a direction along the axial direction X of the pin part 26 of the male member 22.

A pair of the sliding dies 206 is provided. These sliding dies 206 are formed to be movable in a direction orthogonal to the direction of die opening and closing. Specifically, the sliding die 206 is formed to slide and move inside a through hole 204B provided in the movable die 204. Note that, with the present embodiment, the sliding dies 206 are formed to be movable in a left/right direction on the paper surface illustrated in FIG. 30. Furthermore, a molding surface 209C that forms part of the molding surface 209, and is different than the molding surface 209A and the molding surface 209B, is formed on both of these sliding dies 206. Specifically, the molding surface 209C is provided on a tip end (end part on a moving direction side) of the sliding die 206. This molding surface 209C is a molding surface for molding the tolerance part 28 of the pin part 26 of the male member 22.

Furthermore, a gate (omitted from the figure) for guiding molten resin toward the cavity 208 is provided on the fixed die 202.

A method for manufacturing the male member 22 of the present embodiment will be described next.

First, the fixed die 202, the movable die 204, and the sliding die 206 are closed to form the cavity 208 for forming the male member 22.

Next, molten resin is guided through the gate to the cavity 208 of the die 200, which is in a heated state.

After cavity 208 has been filled with the molten resin, the molten resin is cooled. Note that the molten resin may be either naturally cooled or forced cooled.

After the molten resin has been cooled and cured, the sliding die 206 is moved orthogonal to the die opening and closing direction toward a direction away from the cavity 208. Next, the movable die 204 is moved toward the die opening direction. Finally, a resin molded product formed in the shape of the cavity 208, such as, for example, an eject pin, or the like, is removed (in other words, the resin molded product is demolded) from the fixed die 202. This forms the male member 22, which is a resin molded product.

Here, with the method for manufacturing the male member 22, the circular convex part 38 of the male member 22 is formed by the molding surface 209B of the movable die 204. Specifically, this circular convex part 38 is formed such that the tapered surface 38A of the circular convex part 38 is formed continuously in a circumferential direction. In other words, no parting line that would divide the tapered surface 38A in a circumferential direction is formed in the tapered surface 38A. Accordingly, since no parting line is formed in the tapered surface 38A, the male member 22 manufactured by the method for manufacturing the male member 22 provides stable water stopping performance between the male member 22 and the female member 40. Furthermore, since no parting line is formed in the tapered surface 38A in the male member 22 manufactured by the method for manufacturing the male member 22, no postprocessing, such as deburring, or the like, is required.

Figure 31:
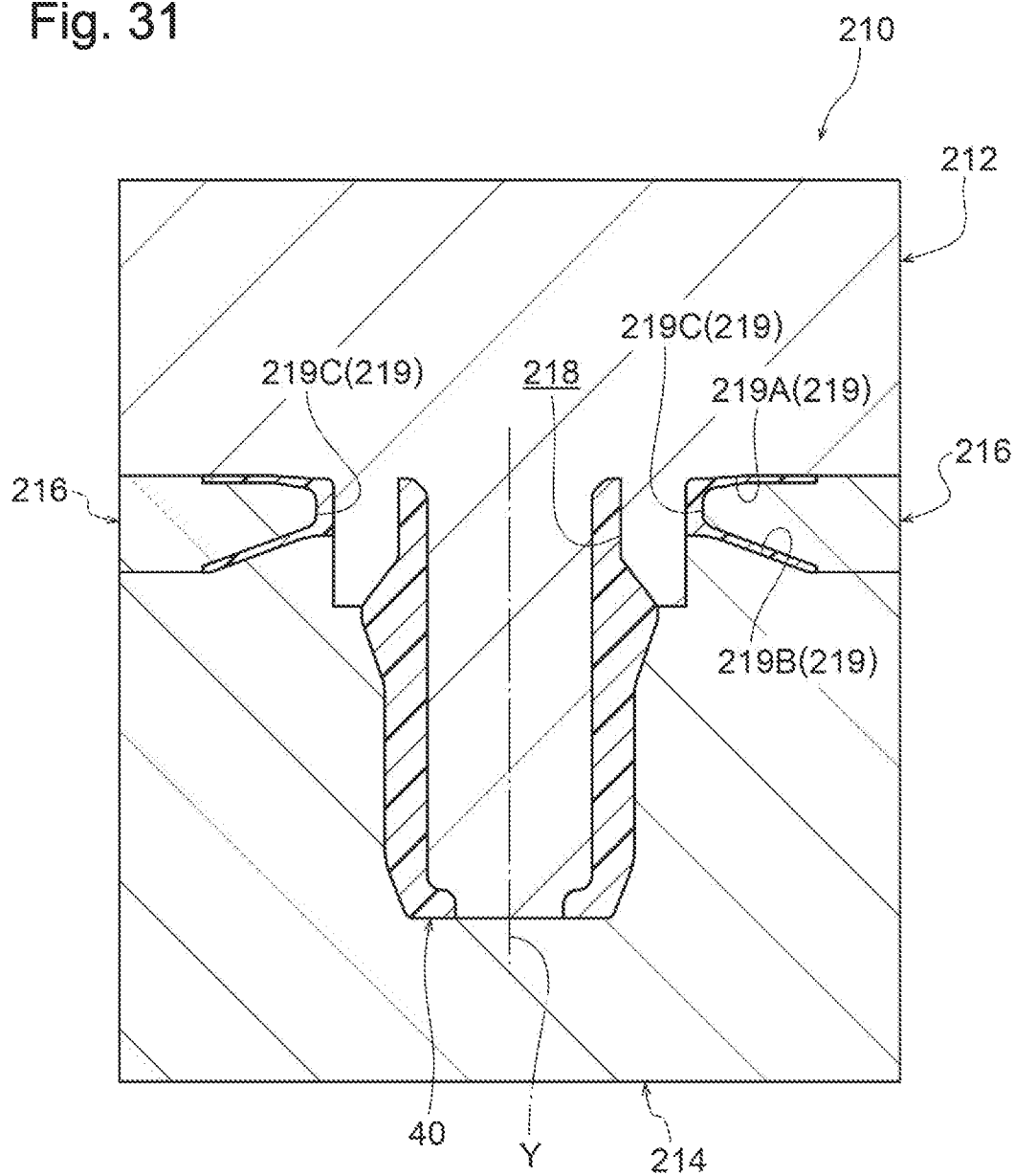
FIG. 31 is a die cross sectional view (die cross sectional view corresponding to a cross section of the female member illustrated in FIG. 13) illustrating a method for manufacturing a female member for forming a clip according to the first embodiment.

As illustrated in FIG. 31, the die 210 used to manufacture the female member 40 is provided with a fixed die 212, a movable die 214, and a sliding die 216. The fixed die 212, the movable die 214, and the sliding die 216 are used to form a cavity 218 for forming the female member 40.

The fixed die 212 is a convex die (a so-called core). A molding surface 219A that forms part of a molding surface 219 for molding the female member 40, which is a wall surface that molds the cavity 218, is provided in this fixed die 212.

The movable die 214 is a concave die (a so-called cavity). A molding surface 219B that forms a different part of the molding surface 219 than the molding surface 219A is provided in this movable die 214. Furthermore, a direction for opening and closing the movable die 214 and the fixed die 212 is a direction along the cylinder axial direction Y of the cylindrical part 42 of the female member 40.

A pair of the sliding dies 216 is provided. These sliding dies 216 are formed to be movable in a direction orthogonal to the direction of die opening and closing. Specifically, the sliding die 216 is formed to slide and move between the fixed die 212 and the movable die 214. Note that, with the present embodiment, the sliding die 216 is formed to be movable in a left/right direction on the paper surface illustrated in FIG. 31. Furthermore, a molding surface 219C that forms part of the molding surface 219, and is different than the molding surface 219A and the molding surface 219B, is formed on both of these sliding dies 216. Specifically, the molding surface 219C is provided on a tip end (end part on a moving direction side) of the sliding die 216. This molding surface 219C is a molding surface for molding a portion between the seal part 52 and the seal part 54 of the female member 40.

Furthermore, a gate (omitted from the figure) for guiding molten resin toward the cavity 218 is provided on the fixed die 212.

A method for manufacturing the female member 40 of the present embodiment will be described next.

First, the fixed die 212, the movable die 214, and the sliding die 216 are closed to form the cavity 218 for forming the female member 40.

Next, molten resin is guided through the gate to the cavity 218 of the die 210, which is in a heated state.

After cavity 218 has been filled with the molten resin, the molten resin is cooled. Note that the molten resin may be either naturally cooled or forced cooled.

After the molten resin has been cooled and cured, the sliding die 216 is moved orthogonal to the die opening and closing direction toward a direction away from the cavity 218. Next, the movable die 214 is moved toward the die opening direction. Finally, a resin molded product formed in the shape of the cavity 218, such as, for example, an eject pin, or the like, is removed (in other words, the resin molded product is demolded) from the fixed die 212. This forms the female member 40, which is a resin molded product.

Here, with the method for manufacturing the female member 40, a sealing surface (surface on the male member 22 side in the cylinder axial direction Y in FIG. 13) of the seal part 52 of the female member 40 is formed by the molding surface 219A of the fixed die 212. Since a portion of the molding surface 219A corresponding to the sealing surface of the seal part 52 is continuous in a circumferential direction, the sealing surface is formed continuously in the circumferential direction. In other words, no parting line that would divide the sealing surface in the circumferential direction is formed in the sealing surface of the seal part 52. Accordingly, since no parting line is formed in the sealing surface of the seal part 52, the female member 40 manufactured by the method for manufacturing the female member 40 described above provides stable water stopping performance between the male member 22 and the female member 40. Specifically, water stopping performance between the male member 22 and the female member 40 is made more stable because no parting lines are formed in the circular convex part 38 of the male member 22 and no parting lines are formed in the sealing surface (surface that makes contact with the circular convex part 38 illustrated in FIG. 13) of the seal part 52 of the female member 40.

Additionally, with the method for manufacturing the female member 40 described above, a sealing surface (surface on the opposite side of the male member 22 in the cylinder axial direction Y in FIG. 13) of the seal part 54 of the female member 40 is formed by the molding surface 219B of the movable die 214. Since a portion of the molding surface 219B corresponding to the sealing surface of the seal part 54 is continuous in a circumferential direction, the sealing surface is formed continuously in the circumferential direction. In other words, no parting line that would divide the sealing surface in the circumferential direction is formed in the sealing surface of the seal part 54. Accordingly, since no parting line is formed in the sealing surface of the seal part 54, the female member 40 manufactured by the method for manufacturing the female member 40 described above provides stable water stopping performance between the female member 40 and the vehicle body 102.

Additionally, with the method for manufacturing the female member 40 described above, since no parting lines are formed in the sealing surface of the seal part 52 or in the sealing surface of the seal part 54, no post-processing such as deburring, or the like, is required. Additionally, since no parting lines are formed in the sealing surface of the seal part 52 or in the sealing surface of the seal part 54 of the female member 40 manufactured by the manufacturing method described above, there is no need to provide a separate gasket to ensure water stopping performance, and thus an increase in a number of components for the clip 20 can be suppressed.

Although the die 200 used to manufacture the aforementioned male member 22 was formed by making the movable die 204 having the molding surface 209B movable in a die opening and closing direction with respect to the fixed die 202 having the molding surface 209A, the configuration according to the present disclosure is not limited thereto. For example, the fixed die 202 may be a movable die that is able to move, and the movable die 204 may be a fixed die that is unable to move.

Furthermore, although the die 210 used to manufacture the aforementioned female member 40 was formed by making the movable die 214 having the molding surface 219B movable in a die opening and closing direction with respect to the fixed die 212 having the molding surface 219A, the configuration according to the present disclosure is not limited thereto. For example, the fixed die 212 may be a movable die that is able to move, and the movable die 214 may be a fixed die that is unable to move.

A use and effect of the present embodiment will be described next.

With the clip 20, the pin part 26 is first inserted into the first inserting position inside the cylindrical part 42 of the female member 40 while the head part 24 of the male member 22 is being pushed. As illustrated in FIG. 12, when the pin part 26 is inserted into the first inserting position, the pin part 26 engages with the engaging hook 44. Specifically, the tip end part of the hook part 44B of the engaging hook 44 of the cylindrical part 42 fits into the engaging concave part 34 of the pin part 26 and the engaging hook 44 engages with the engaging concave part 34. This engagement prevents the pin part 26 from moving in the removal direction with respect to the cylindrical part 42. Since the engaging concave part 34 and the engaging hook 44 are engaged in this way when the pin part 26 is in the first inserting position, the male member 22 and the female member 40 are held in a provisionally assembled state.

Next, the head part 24 of the male member 22 is pushed and the cylindrical part 42 of the female member 40 is inserted toward the attaching hole 102A of the vehicle body 102. Here, since the pin part 26 is in the first inserting position when the cylindrical part 42 is inserted toward the attaching hole 102A, the elastic deformation of the engaging hook 46 toward the inside of the cylindrical part is allowed by the tolerance part 28 of the pin part 26, and thus the engaging hook 46 elastically deforms toward the inside of the cylindrical part and the cylindrical part 42 passes the engaging hook 46 and is inserted into the attaching hole 102A. As illustrated in FIG. 13, when the hook part 46B of the engaging hook 46 passes through the attaching hole 102A, the engaging hook 46 returns elastically and the hook part 46B engages with the edge of the attaching hole 102A. This engagement keeps the female member 40 from coming out of the attaching hole 102A. Furthermore, almost simultaneous with the engagement described above, the pin part 26 reaches the second inserting position. Furthermore, when the pin part 26 reaches the second inserting position, the engaging hook 46 is supported from inside the cylindrical part 42 by the stopping part 30 of the pin part 26, thus stopping the elastic deformation of the engaging hook 46 toward the inside of the cylindrical part 42. Additionally, as illustrated in FIG. 13, with the present embodiment, since the engaging hook 46 is pushed toward the outside of the cylindrical part 42 by the stopping part 30 when the pin part 26 is in the second inserting position, the engagement of the engaging hook 46 toward the edge of the attaching hole 102A is strengthened. This holds the female member 40 in the vehicle body 102. Furthermore, when the pin part 26 is in the second inserting position, the pin part 26 and the engaging hook 44 engage. Specifically, the tip end part of the hook part 44B of the engaging hook 44 fits into the engaging concave part 36 of the pin part 26 and the engaging hook 46 engages with the engaging concave part 36. This engagement prevents the pin part 26 from moving in the removal direction with respect to the cylindrical part 42. Since the engaging concave part 36 and the engaging hook 46 are engaged in this way when the pin part 26 is in the second inserting position, the male member 22 and the female member 40 are held in the assembly state.

In this way, the clip 20 and the retainer 104 are both attached to the vehicle body 102.

Here, with the clip 20, after the male member 22 and the female member 40 are provisionally assembled, the cylindrical part 42 of the female member 40 is inserted toward the attaching hole 102A of the vehicle body 102 while the head part 24 of the male member 22 is being pushed, which causes the female member 40 to be held in the vehicle body 102, the male member 22 and female member 40 to be assembled (the assembly), and the retainer 104 to be attached to the vehicle body 102 together with the clip 20. That is, since the clip 20 can be attached to the vehicle body 102 by a single pushing operation, the clip can be attached to the vehicle body 102 by a simple operation.

Furthermore, with the clip 20, since the external form of the head part 24 of the male member 22 is made larger than the external form of the female member 40, pushing the head part 24 is easier than in, for example, a configuration where the external form of the head part is smaller than the external form of the female member, thus making an operation for pushing the pin part 26 in simpler.

Furthermore, with the clip 20, since the engaging hook 44 and the engaging concave part 34 engage when the pin part 26 is in the first inserting position, movement of the pin part 26 toward the removal direction (side opposite the inserting direction) is limited. That is, the pin part 26 is held in the cylindrical part 42 by the engagement between the engaging hook 44 and engaging concave part 34 when the pin part 26 is in the first inserting position.

Additionally, with the clip 20, since the engaging hook 44 and the engaging concave part 36 engage when the pin part 26 is in the second inserting position, movement of the pin part 26 toward a side opposite the inserting direction is limited. That is, the pin part 26 is held in the cylindrical part 42 by the engagement between the engaging hook 44 and engaging concave part 36 when the pin part 26 is in the second inserting position.

With the clip 20, since, as illustrated in FIG. 13 and FIG. 14, the seal part 52 of the female member 40 makes contact with the circular convex part 38 of the male member 22 when the pin part 26 is in the second inserting position, a seal is formed between the male member 22 and the female member 40 by the seal part 52. Furthermore, since the seal part 54 makes contact with the peripheral part of the attaching hole 102A when the cylindrical part 42 of the female member 40 is inserted into the attaching hole 102A, a seal is formed between the vehicle body 102 and the female member 40 by the seal part 54. Thus, when the clip 20 is attached to the vehicle body 102, a seal is formed between the male member 22 and the female member 40 by the seal part 52 and a seal is formed between the female member 40 and the vehicle body 102 by the seal part 54.

That is, the clip 20 can be attached to the vehicle body 102 and secured in a sealed state by a simple operation.

Furthermore, with the clip 20, since an engaging hook is provided on the cylindrical part 42 in a different position than the engaging hook 44 in a circumferential direction and the engaging hook 48 engages with the wall part 28B of the pin part 26 when the pin part 26 is in the second inserting position, the pin part 26 is further suppressed from coming out of the cylindrical part 42.

Second Embodiment

A clip according to a second embodiment will be described next using FIG. 15 through FIG. 29. Note that descriptions of configurations for a clip 60 that are the same as those according to the first embodiment have been omitted.

Figure 25:
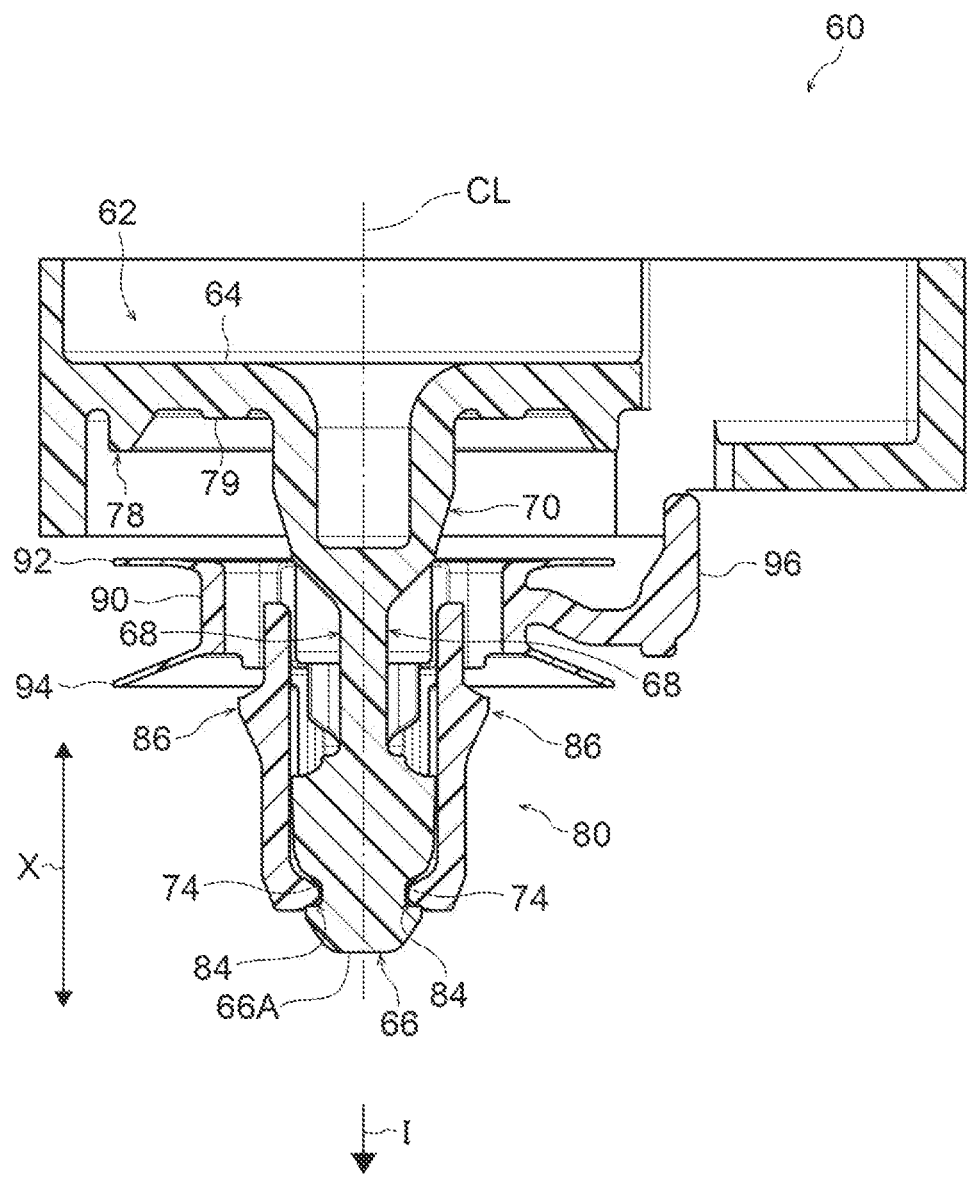
FIG. 25 is a cross sectional view (cross sectional view along a first direction) illustrating the male member and female member in a provisionally assembled state.
Figure 26:
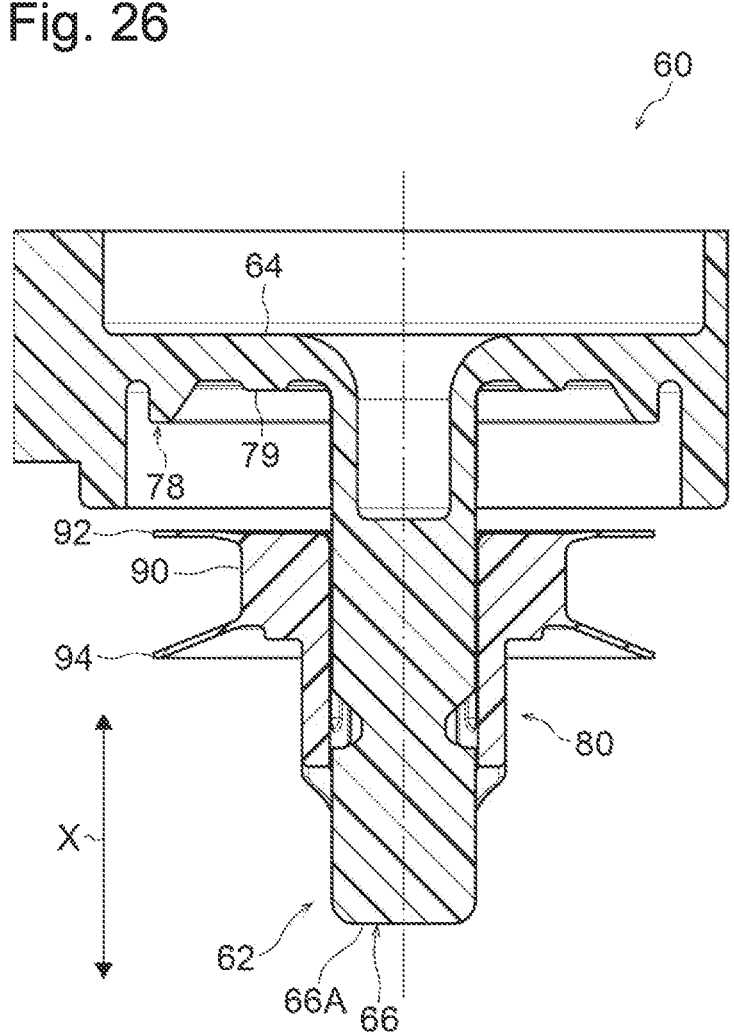
FIG. 26 is a cross sectional view (cross sectional view along a second direction) illustrating the male member and female member in a provisionally assembled state.

As illustrated in FIG. 25 and FIG. 26, the clip 60 according to the present embodiment includes a male member 62 formed from resin and a female member 80 formed from resin. With the present embodiment, a plurality (two) of male members 62 is provided integrally with a retainer 106 in order to hold a vehicle component not illustrated in the figures against the vehicle body 102.

As illustrated in FIG. 15 and FIG. 18, the male member 62 is provided integrally with the retainer 106, as described above, and includes a head part 64 and a pin part 66.

Figure 19:
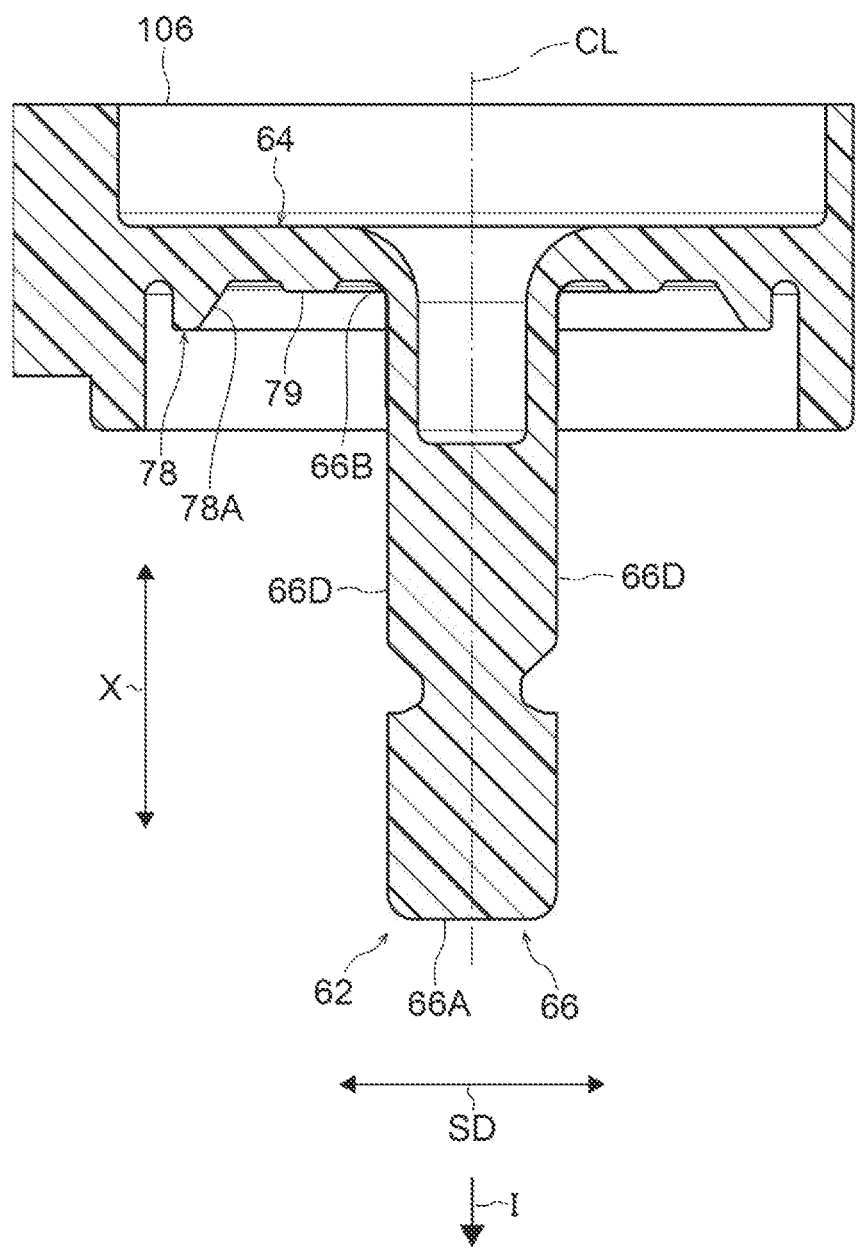
FIG. 19 is a cross sectional view of the male member in FIG. 16 along line 19-19.

As illustrated in FIG. 18 and FIG. 19, the head part 64 is a flat plate-like part formed on the retainer 106. Furthermore, as illustrated in FIG. 25 and FIG. 26, an external form of the head part 64 is larger than an external form of the female member 80.

A cross sectional shape of the pin part 66 is approximately round and rod-shaped, and, as illustrated in FIG. 18, protrudes from the head part 64 in a thickness direction of the head part 64. Note that, in the present embodiment, an axial direction of the pin part 66 is the same as the thickness direction of the head part 64. Furthermore, the axial direction of the pin part 66 is described below as appropriate axial direction X.

A tolerance part 68 and a stopping part 70 are provided, respectively, on a pair of facing side parts 66C in a first direction (direction FD in FIG. 18) orthogonal to the axial direction of the pin part 66 between one end part 66A positioned on one side (lower side in FIG. 18) of the pin part 66 in the axial direction X and another end part 66B positioned on another side (upper side in FIG. 18). Specifically, as illustrated in FIG. 15 and FIG. 18, the tolerance part 68 is provided on the one end part 66A side of the pin part 66, and the stopping part 70 is provided more toward the other end part 66B side of the pin part 66 than the tolerance part 68.

As illustrated in FIG. 18, the tolerance part 68 is a concave-shaped portion provided in the side parts 66C of the pin part 66, and a portion that allows elastic deformation of an engaging hook 86, to be described below, of the female member 80 toward an inside of a cylindrical part (inside of a cylindrical part 82). Here, elastic deformation of the engaging hook 86 toward the inside of the cylindrical part means that the engaging hook 86 of the male member 62 is elastically deformed toward the axial center AL side (in other words, a radial direction inside the cylindrical part 82) of the cylindrical part 82 of the female member 80. Note that elastic deformation of the engaging hook 86 toward an outside of the cylindrical part means that the engaging hook 86 of the male member 62 is elastically deformed toward a side opposite (radial direction outside) the axial center AL side of the cylindrical part 82 of the female member 80. Note that the wall part 68B on one side of the tolerance part 68 in the axial direction X according to the present embodiment is one example of the second engaged part according to the present disclosure.

Meanwhile, as illustrated in FIG. 18, the stopping part 70 is a rising portion (in the present embodiment, a portion protruding from the surface of the side wall 26C) provided on the pin part 66, and thus a portion that supports the engaging hook 86 from inside the cylindrical part and stops the elastic deformation of the engaging hook 86 toward the inside of the cylindrical part. Note that, as illustrated in FIG. 25, the distance D1 between a pair of top parts 70A of the stopping part 70 facing each other in the first direction FD is longer than the distance D2 between inner surfaces of the engaging hook 86 in an unloaded state.

Furthermore, an engaging concave part 74 with which the engaging hook 86, described below, of the female member 80 engages on one side in the axial direction X is provided on a pair of side parts 66C of the pin part 66. Note that the engaging concave part 74 according to the present embodiment is one example of the first engaged part according to the present disclosure.

As illustrated in FIG. 18 and FIG. 19, a circular convex part 78 that surrounds the pin part 66 is provided on the head part 64. This circular convex part 78 is a circular convex portion protruding from a surface on the pin part 66 side of the head part 64 along the axial direction X. Furthermore, a radial direction inner corner on the circular convex part 78 is formed into a tapered surface 78A. A seal part 92 of the female member 80 is made to make contact with this circular convex part 78.

Furthermore, a circular convex part 79 that surrounds the pin part 66 is provided on the head part 64 further inward in a radial direction than the circular convex part 78. A protrusion height of this circular convex part 79 is lower than that of the circular convex part 78. Because this circular convex part 79 makes contact with a flange part 90, described below, of the female member 80, the male member 62 can be prevented from being inserted too far with respect to the female member 80.

Figure 21:
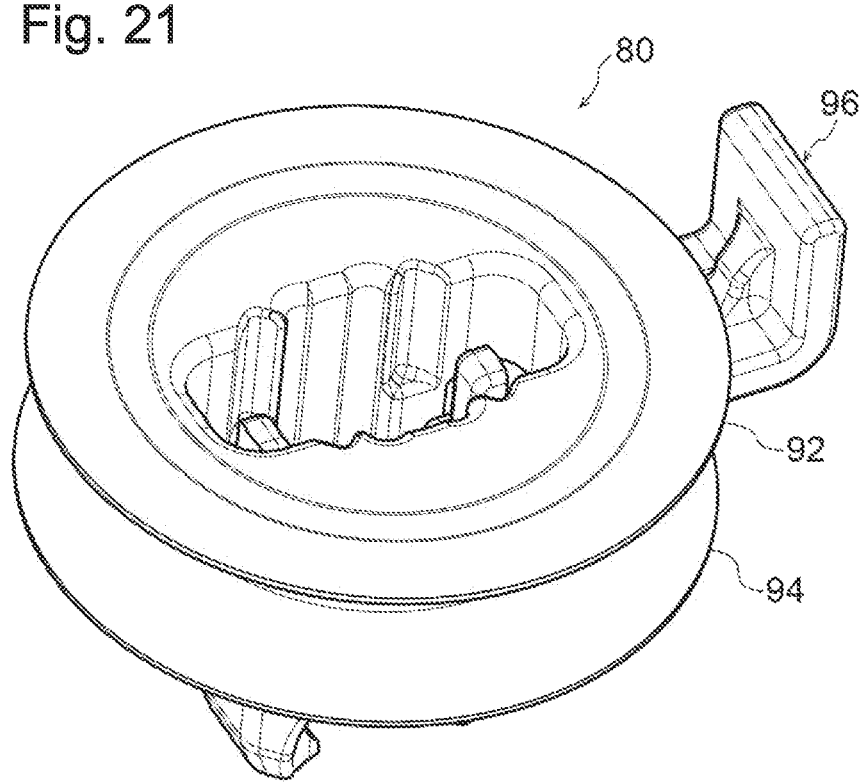
FIG. 21 is a perspective view of the female member in FIG. 20 seen from a flange part side.

As illustrated in FIG. 21, the female member 80 includes the cylindrical part 82, an engaging hook 84, and the engaging hook 86. Note that the engaging hook 84 according to the present embodiment is the first engaging hook according to the present disclosure and the engaging hook 86 according to the present embodiment is the second engaging hook according to the present disclosure.

Figure 20:
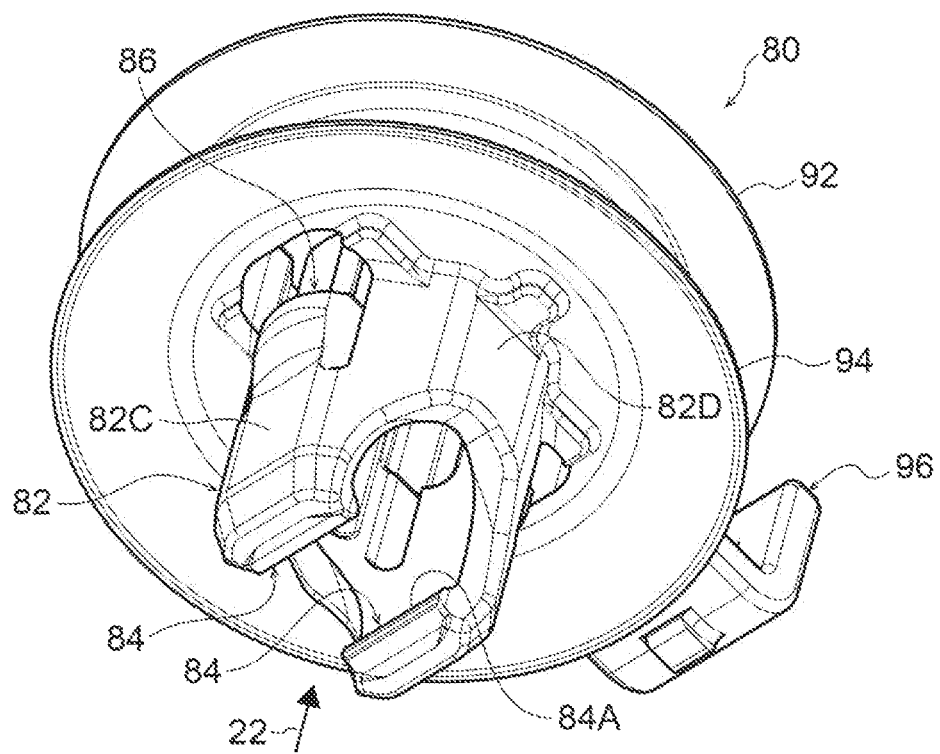
FIG. 20 is a perspective view of a female member forming a clip according to the second embodiment of the present disclosure seen from a cylindrical part side.
Figure 22:
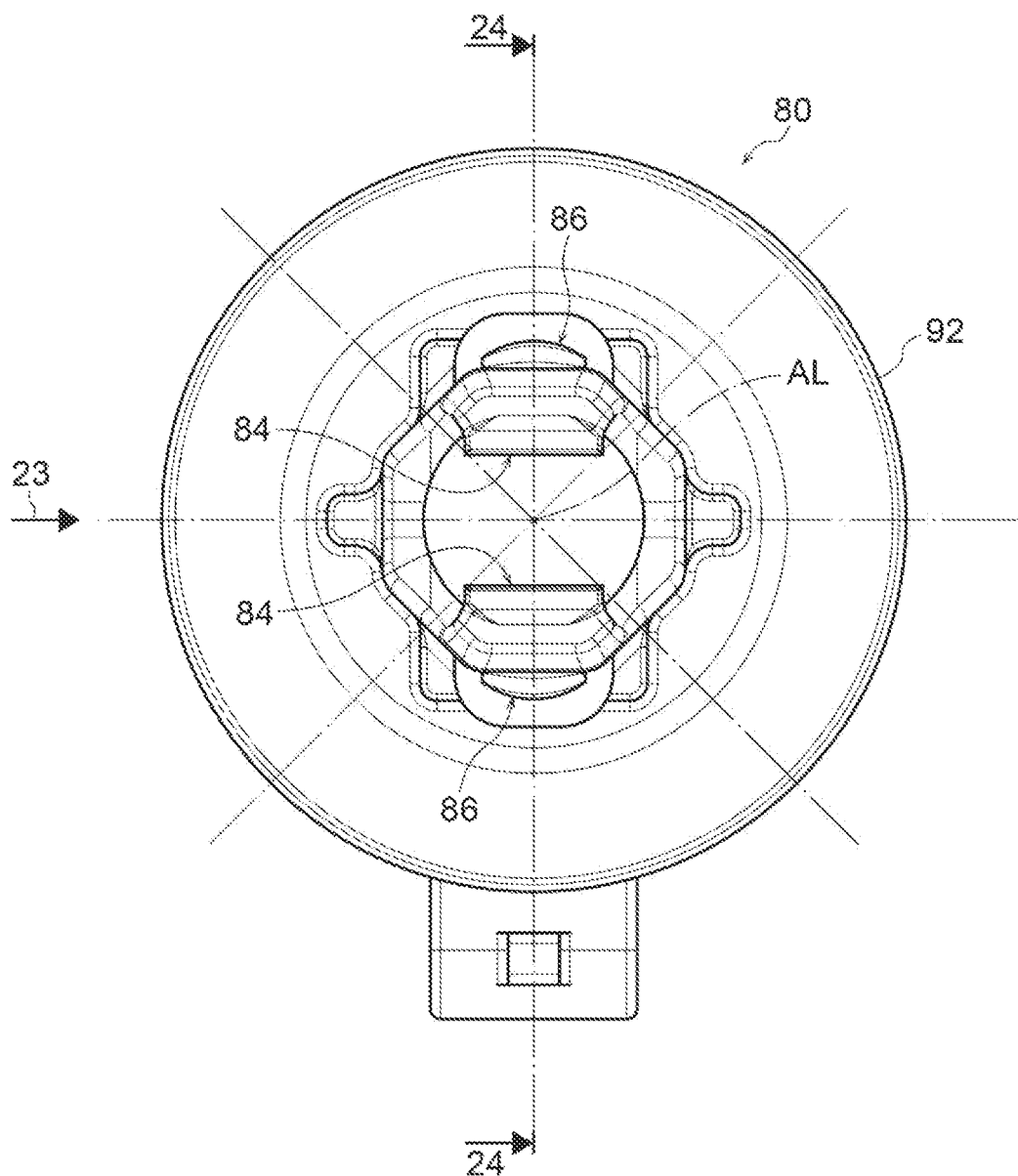
FIG. 22 is a bottom surface view (side surface view of the female member in FIG. 20 seen from the direction of Arrow 22) of the female member in FIG. 20.

As illustrated in FIGS. 20 and 22, the cylindrical part 82 is a cylinder with a substantially round cross-sectional shape and is designed so that the pin part 66 of the male member 62 is inserted inside thereof. That is, an internal form of the cylindrical part 82 is shaped to correspond to an external form of the male member 62. Therefore, the cylindrical part 82 is relatively rotatable with respect to the pin part 66 with the pin part 66 as the axis. Furthermore, the cylindrical part 82 is made to be inserted into the attaching hole 102A formed in the vehicle body 102. Note that the attaching hole 102A according to the present embodiment is a through hole with an essentially regular quadrangular shape (specifically, a regular quadrangle with rounded corners). Furthermore, hereinafter, a cylinder axial direction of the cylindrical part 82 will be illustrated using the symbol Y and an axial center of the cylindrical part 82 will be illustrated using the symbol AC. Note that, since an axial center CL of the pin part 66 of the male member 62 and an axial center AL of the cylindrical part 82 of the female member 80 approximately match when the male member 62 and the female member 80 are in an assembled state, only the axial center CL and the axial direction X are illustrated in, and the axial center AL and the cylinder axial direction Y are omitted from the drawings (that is, FIG. 25 through FIG. 27) that illustrate assembled states.

Figure 23:
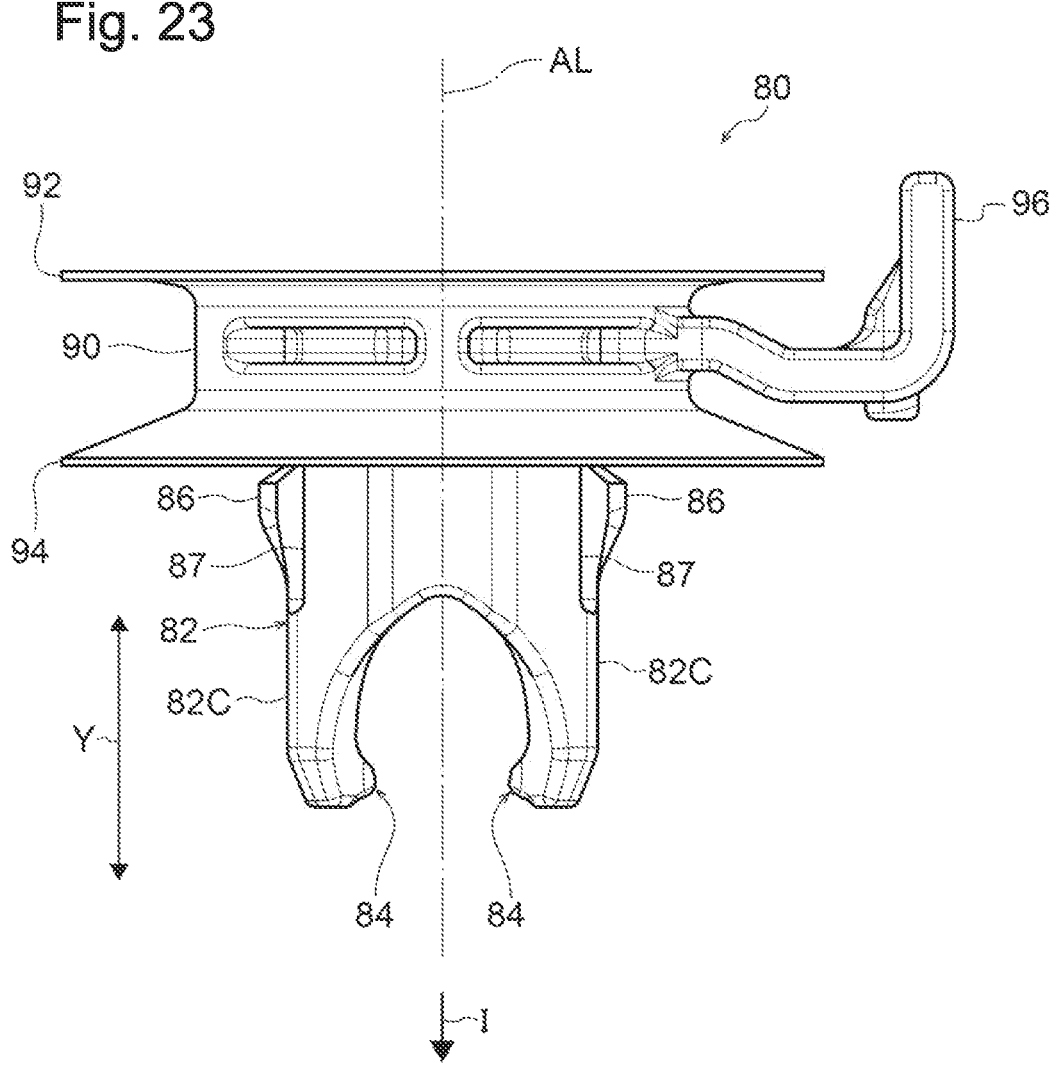
FIG. 23 is a side surface view (side surface view of the female member in FIG. 22 seen from the direction of Arrow 23) of the female member in FIG. 22.
Figure 24:
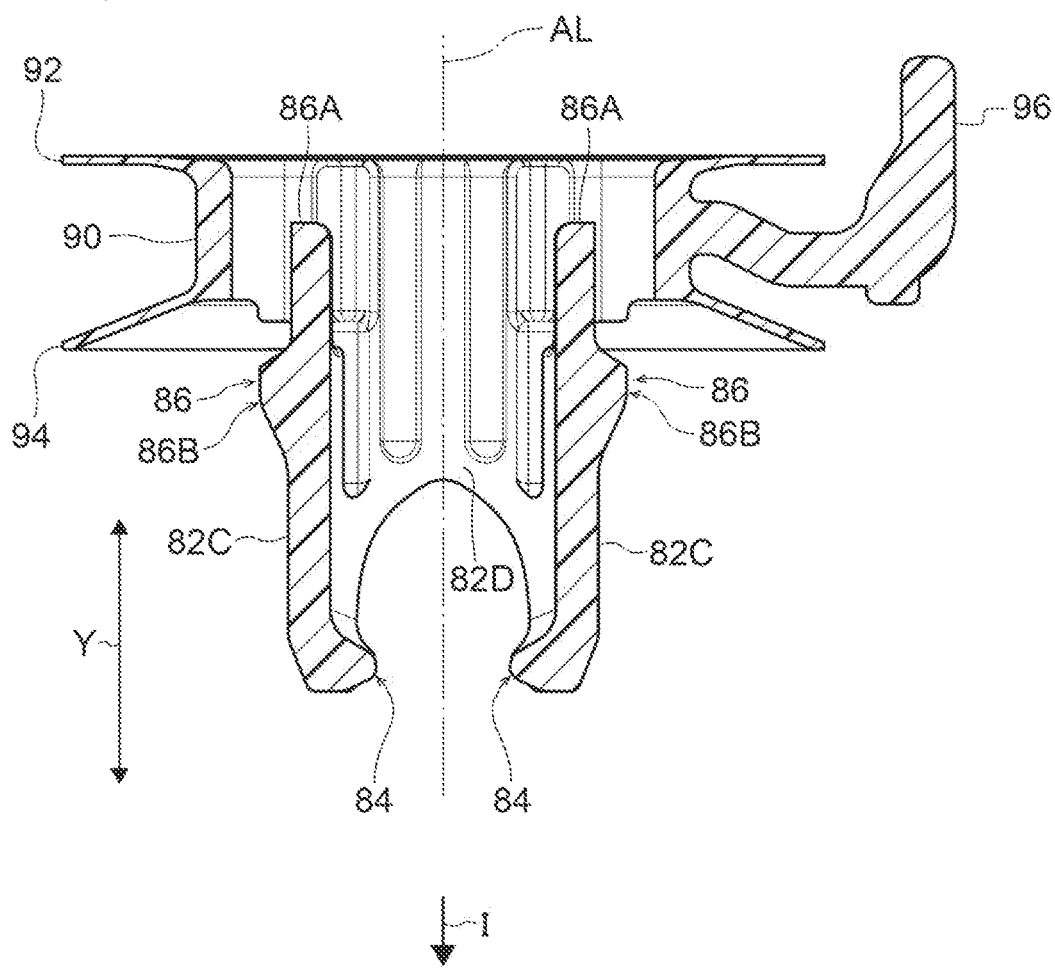
FIG. 24 is a cross sectional view of the female member in FIG. 22 along line 24-24.

As illustrated in FIG. 23 and FIG. 24, with the male member 62 and the female member 80 in an assembled state (including provisional assembly and the assembly), the engaging hook 84 is provided on each of a pair of side walls 82C facing the pair of the side parts 66C of the pin part 66, respectively. This engaging hook 84 extends from a tip end part of the side wall 82C toward the inside of the cylindrical part 82. Note that, with the present embodiment, a pair of side walls 82D facing the pair of side walls 66D of the pin part 66, respectively, is formed with a notch extending from one end part of the cylindrical part 82 in the cylinder axial direction Y to near a center part. This notch makes the tip end part of the side wall 82C a free end.

Figure 27:
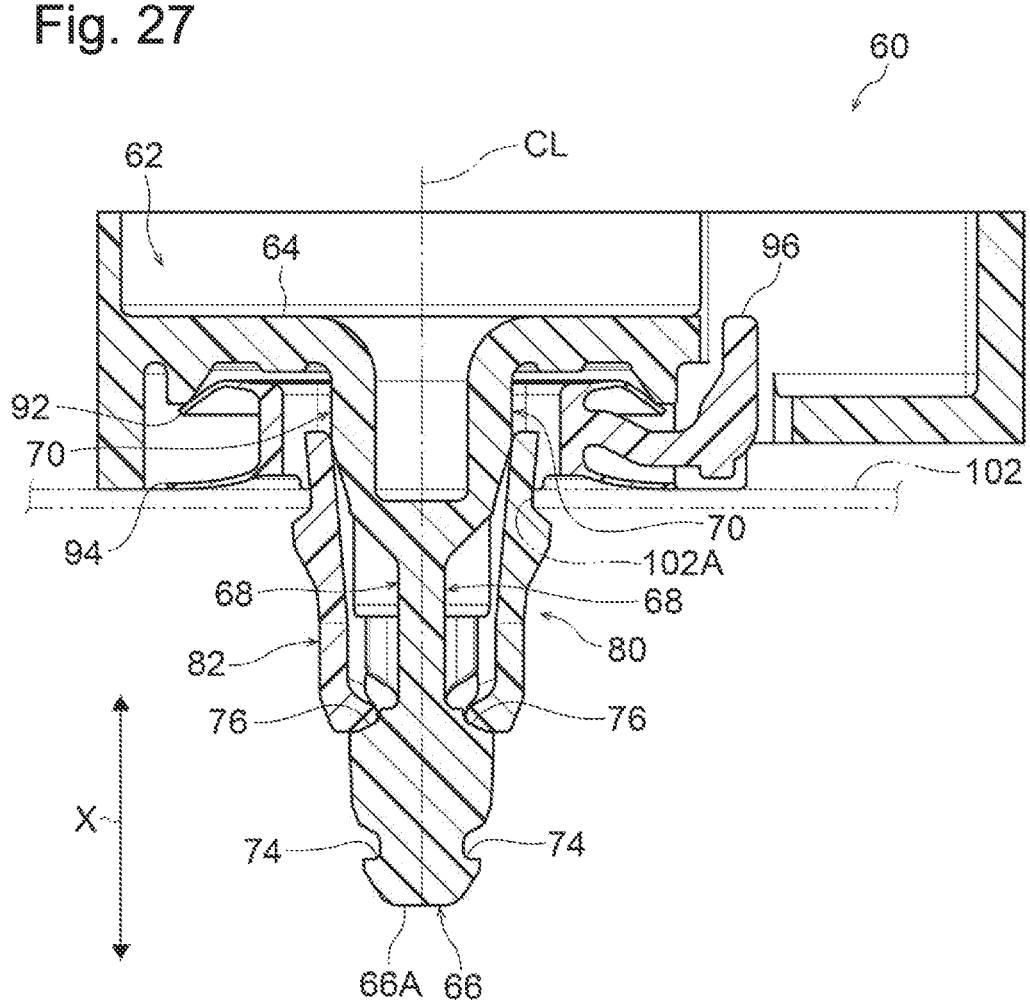
FIG. 27 is a cross sectional view (cross sectional view along a first direction) illustrating the male member and female member in the assembly state.

Here, an inserting position (inserting position in FIG. 25 and FIG. 26) of the pin part 66, when, as illustrated in FIG. 25, the pin part 66 is inserted into the cylindrical part 82 and the engaging hook 84 is engaged with the engaging concave part 74, is referred to as a first inserting position, and an inserting position (inserting position in FIG. 27) of the pin part 66, when, as illustrated in FIG. 27, the pin part 66 is inserted further to the back of the cylindrical part 82 than the first inserting position and the engaging hook 84 is engaged with an engaging concave part 76, is referred to as a second inserting position.

As is illustrated in FIG. 25, with the male member 62 and the female member 80 in an assembled state (including provisional assembly and the assembly), the engaging hook 86 is provided on each of the pair of side walls 82C facing the pair of the side parts 66C of the pin part 66, respectively. This engaging hook 86 is a plate-like portion formed between two slits 87 that extend, with respect to the side part 66C, from another end part 82B of the cylindrical part 82 in the cylinder axial direction toward a one end part 82A side, and is elastically deformable. Another end part (end part on another side) of this engaging hook 86 is a fixed end connected to the side wall 82D, and one end part (end part on one side) thereof in the cylinder axial direction Y is supported in a cantilevered state as a free end. Furthermore, this engaging hook 86 includes a linear part 86A extending along the cylinder axial direction Y from the one end part in the cylinder axial direction Y and a hook part 86B that is a convex part protruding in a direction that moves away from the axial center AL from an outer surface of the linear part 86A. This hook part 86B has a mountain-like cross sectional shape. Here, as illustrated in FIG. 27, after the hook part 86B of the elastically deformed engaging hook 86 has passed through the attaching hole 102A of the vehicle body 102, the linear part 86A returns elastically and the hook part 86B engages with the edge of the attaching hole 102A.

Note that, with the present embodiment, the pin part 66 is formed so that, as illustrated in FIG. 25, the tolerance part 68 is positioned inside a cylindrical part of the engaging hook 86 when the pin part 66 is in the first inserting position, and so that, as illustrated in FIG. 27, the stopping part 70 is positioned inside the cylindrical part 82 of the engaging hook 86 when the pin part 66 is in the second inserting position. Therefore, as illustrated in FIG. 25, since the tolerance part 68 is positioned inside the cylindrical part when the pin part 66 is in the first inserting position, the engaging hook 86 is allowed to elastically deform toward the inside of the cylindrical part. Furthermore, as illustrated in FIG. 27, since the stopping part 70 is positioned inside the cylindrical part when the pin part 66 is in the second inserting position, the hook is supported from inside the cylindrical part by the stopping part 70 and thus prevented from elastically deforming toward the inside of the cylindrical part.

Furthermore, as illustrated in FIG. 23 and FIG. 24, the female member 80 includes a flange part 90, a seal part 92, and a seal part 94. Note that the seal part 92 according to the present embodiment is one example of the first seal part according to the present disclosure and the seal part 94 according to the present embodiment is one example of the second seal part according to the present disclosure.

As illustrated in FIG. 23 through FIG. 24, the flange part 90 is a circular portion that overhangs from another end part 82B of the cylindrical part 82 in the cylinder axial direction Y in a direction orthogonal to the cylinder axial direction Y.

As illustrated in FIG. 22 through FIG. 24, the seal part 92 is a portion that overhangs from an outer circumference of the flange part 90, and as illustrated in FIG. 21, a circular portion that is thinner than the flange part 90. This seal part 92 is made to be elastically deformable, and thus makes contact with the circular convex part 78 (to be precise, the tapered surface 78A) and forms a seal between the male member 62 and the female member 80 when the pin part 66 is in the second inserting position.

As illustrated in FIG. 21, FIG. 23, and FIG. 24, the seal part 94 is a portion that overhangs from an outer circumference of the flange part 90, and as illustrated in FIG. 20, a circular portion that is thinner than the flange part 90. Note that the seal part 94 is positioned more to one side (the cylindrical part 82 side) in the cylinder axial direction than the seal part 92. This seal part 94 is made to be elastically deformable and thus makes contact with the peripheral part of the attaching hole 102A and forms a seal between the female member 80 and the vehicle body 102 when the cylindrical part 82 is inserted into the attaching hole 102A.

Furthermore, as illustrated in FIG. 21 and FIG. 23, the female member 80 is provided with an operating lever 96 for rotating the cylindrical part 82 with respect to the pin part 66. As illustrated in FIG. 23, this operating lever 96 is a plate-like portion on an outer circumference of the flange part 90 extending outward in a radial direction of the flange part 90 between the seal part 92 and the seal part 94 that, midway, stretches toward another side in the cylinder axial direction Y. When this operating lever 96 is in the first rotating position (position in FIG. 28), the engaging hook 86 and the edge of the attaching hole 102A engage, and, when the operating lever 96 is in the second rotating position (position in FIG. 29), the engaging hook 86 and the edge of the attaching hole 102A disengage. Specifically, when the operating lever 96 is rotated and operated from the first rotating position to the second rotating position, the cylindrical part 82 is rotated with respect to the pin part 66, and the pair of engaging hooks 86 is lined up diagonally to the attaching hole 102A such that the pair of engaging hooks 86 is positioned inside the attaching hole 102A. In this state, the cylindrical part 82 can be removed from the vehicle body 102. Note that the operating lever 96 according to the present embodiment is one example of the operating part according to the present disclosure.

Furthermore, the attaching hole 102A of the vehicle body 102 includes a first region R1 sized so that the cylindrical part 82 can be inserted therein without elastically deforming the engaging hook 86, and a second region adjacent to the first region R1 that is smaller than the first region R1 and sized so that the cylindrical part 82 can be inserted therein by elastically deforming the engaging hook 86. Here, the attaching hole 102A according to the present embodiment is substantially square in shape, and thus a diagonal line thereacross forms the first region and a space between two opposing sides thereof form the second region. Note that the present disclosure is not limited to this configuration. For example, the attaching hole 102A may also be an ellipse, a long hole, or the like.

Note that the clip attaching structure according to the present embodiment is formed of the vehicle body 102 in which the attaching hole 102A is formed, and the clip 60 attached to the vehicle body 102.

A method for manufacturing the male member 62 and the female member 80 that form the clip 60 according to the present embodiment will be described next. First, a die 250 for manufacturing the male member 62 of the clip 60 will be described, then, a method for manufacturing the male member 62 will be described. Next, a die 260 for manufacturing the female member 80 will be described, then, a method for manufacturing the female member 80 will be described.

Figure 32:
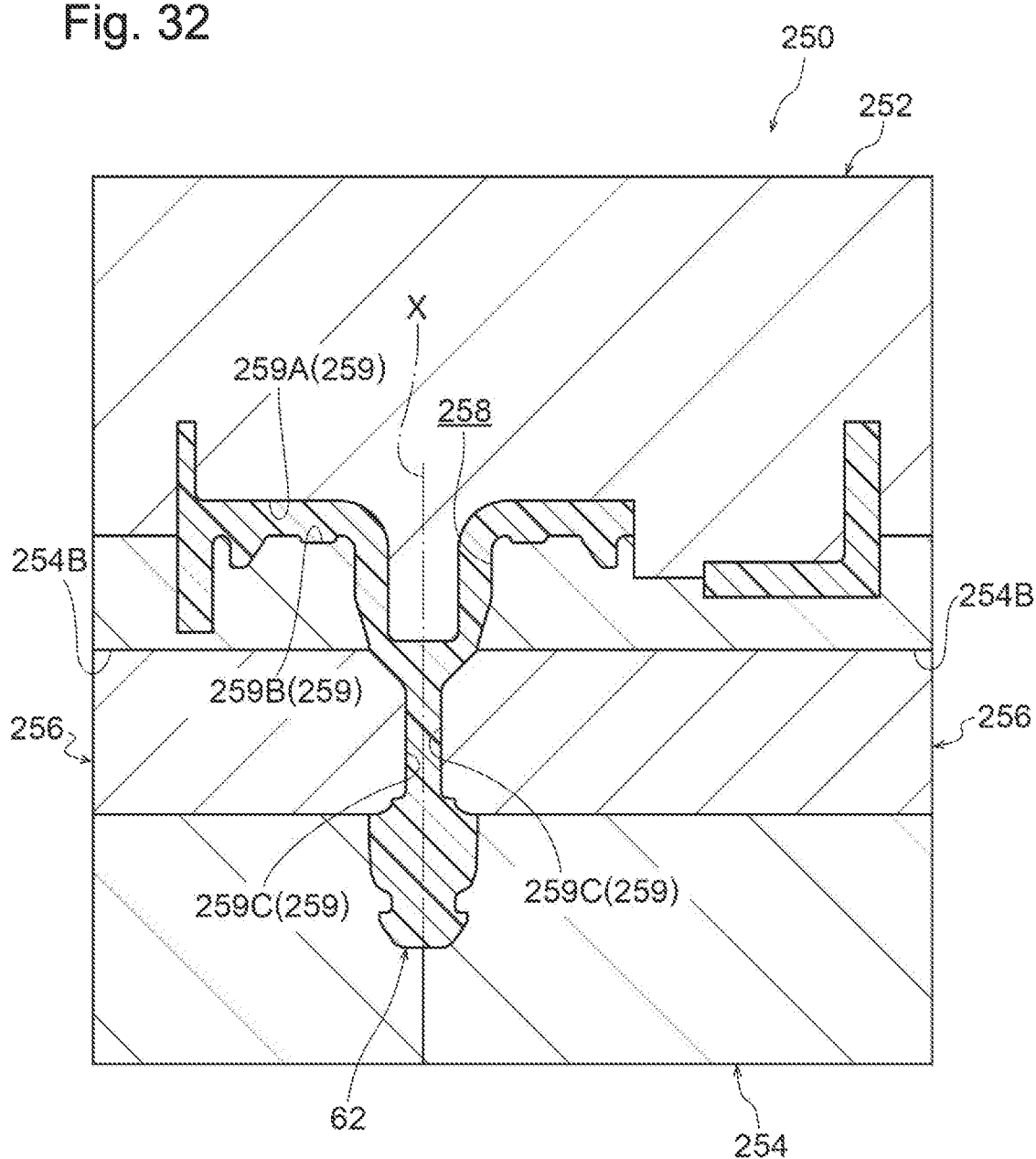
FIG. 32 is a die cross sectional view (die cross sectional view corresponding to a cross section of the male member illustrated in FIG. 27) illustrating a method for manufacturing a male member for forming a clip according to the second embodiment.

As illustrated in FIG. 32, the die 250 used to manufacture the male member 62 is provided with a fixed die 252, a movable die 254, and a sliding die 256. The fixed die 252, the movable die 254, and the sliding die 256 are used to form a cavity 258 for forming the male member 22.

The fixed die 252 is a convex die (a so-called core). A molding surface 259A that forms part of a molding surface 259 for molding the male member 62, which is a wall surface that molds the cavity 258, is provided in this fixed die 252.

The movable die 254 is a concave die (a so-called cavity). A molding surface 259B that forms a different part of the molding surface 259 than the molding surface 259A is provided in this movable die 254. Furthermore, a direction for opening and closing the movable die 254 and the fixed die 252 is a direction along the axial direction X of the pin part 66 of the male member 62.

A pair of the sliding dies 256 is provided. These sliding dies 256 are configured to be movable in a direction orthogonal to the direction of die opening and closing. Specifically, the sliding die 256 is configured to slide and move inside a through hole 254B provided in the movable die 254. Note that, with the present embodiment, the sliding die 256 is formed to be movable in a left/right direction on the paper surface illustrated in FIG. 32. Furthermore, a molding surface 259C that forms part of the molding surface 259, and is different than the molding surface 259A and the molding surface 259B, is formed on both of these sliding dies 256. Specifically, the molding surface 259C is provided on a tip end (end part on a moving direction side) of the sliding die 256. This molding surface 259C is a molding surface for molding the tolerance part 68 of the pin part 66 of the male member 62.

Furthermore, a gate (omitted from the figure) for guiding molten resin toward the cavity 258 is provided on the fixed die 252.

A method for manufacturing the male member 62 of the present embodiment will be described next.

First, the fixed die 252, the movable die 254, and the sliding die 256 are closed to form the cavity 258 for forming the male member 62.

Next, molten resin is guided through the gate to the cavity 258 of the die 250, which is in a heated state.

After cavity 258 has been filled with the molten resin, the molten resin is cooled. Note that the molten resin may be either naturally cooled or forcibly cooled.

After the molten resin has been cooled and cured, the sliding die 256 is moved orthogonal to the die opening and closing direction toward a direction away from the cavity 258. Next, the movable die 254 is moved toward the die opening direction. Finally, a resin molded product formed in the shape of the cavity 258, such as, for example, an eject pin, or the like, is removed (that is, the resin molded product is demolded) from the fixed die 252. This forms the male member 62, which is a resin molded product.

Here, with the method for manufacturing the male member 62, the circular convex part 78 of the male member 62 is formed by the molding surface 259B of the movable die 254. Specifically, this circular convex part 78 is formed such that the tapered surface 78A of the circular convex part 78 is formed continuously in a circumferential direction. In other words, no parting line that would divide the tapered surface 78A in a circumferential direction is formed in the tapered surface 78A. Accordingly, since no parting line is formed in the tapered surface 78A, the male member 62 manufactured by the method for manufacturing the male member 62 provides stable water stopping performance between the male member 62 and the female member 80. Furthermore, since no parting line is formed in the tapered surface 78A in the male member 62 manufactured by the method for manufacturing the male member 62, no post-processing, such as deburring, or the like, is required.

Figure 33:
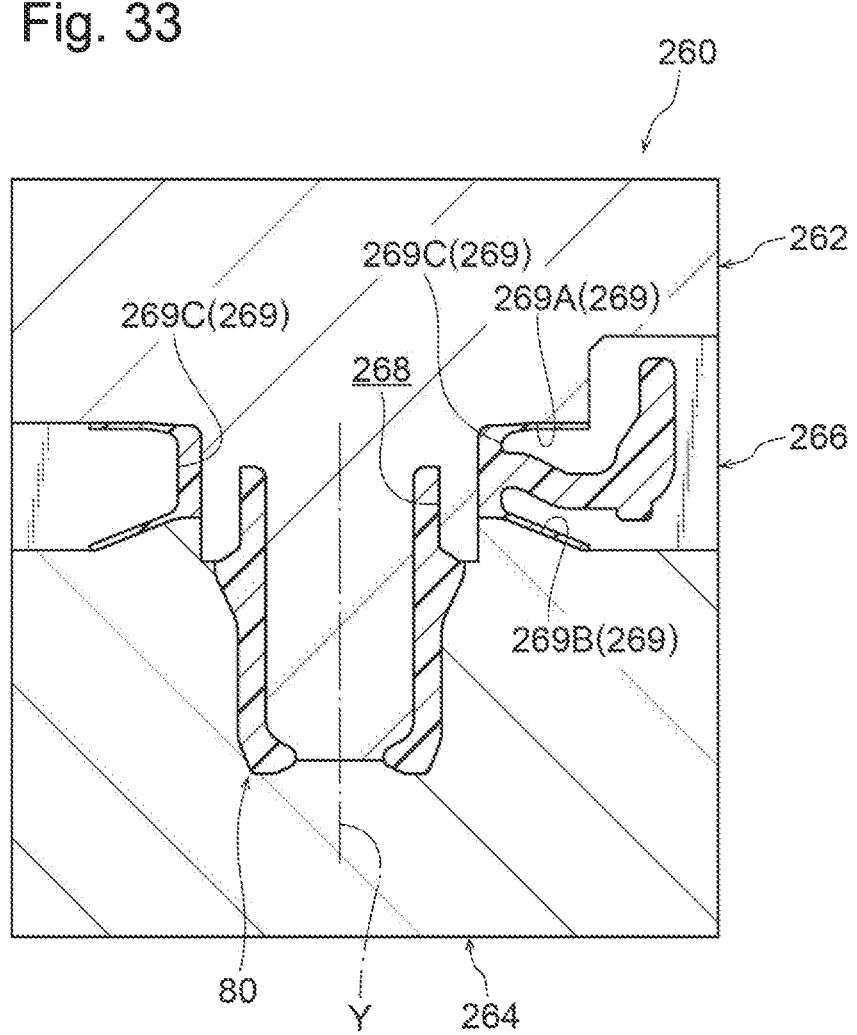
FIG. 33 is a die cross sectional view (die cross sectional view corresponding to a cross section of the female member illustrated in FIG. 27) illustrating a method for manufacturing a female member for forming a clip according to the second embodiment.

As illustrated in FIG. 33, the die 260 used to manufacture the female member 80 is provided with a fixed die 262, a movable die 264, and a sliding die 266. The fixed die 262, the movable die 264, and the sliding die 266 are used to form a cavity 268 for forming the female member 80.

The fixed die 262 is a convex die (a so-called core). A molding surface 269A that forms part of a molding surface 269 for molding the female member 80, which is a wall surface that molds the cavity 268, is provided in this fixed die 262.

The movable die 264 is a concave die (a so-called cavity). A molding surface 269B that forms a different part of the molding surface 269 than the molding surface 269A is provided in this movable die 264. Furthermore, a direction for opening and closing the movable die 264 and the fixed die 262 is a direction along the cylinder axial direction Y of the cylindrical part 82 of the female member 80.

A pair of the sliding dies 266 is provided. These sliding dies 266 are configured to be movable in a direction orthogonal to the direction of die opening and closing. Specifically, the sliding die 266 is configured to slide and move between the fixed die 262 and the movable die 264. Note that, with the present embodiment, the sliding die 266 is configured to be movable in a forward/backward direction on the paper surface illustrated in FIG. 33. Furthermore, a molding surface 269C that forms part of the molding surface 269 and is different than the molding surface 269A and the molding surface 269B, is formed on both of these sliding dies 266. Specifically, the molding surface 269C is provided on a tip end (end part on a moving direction side) of the sliding die 266. This molding surface 269C is a molding surface for molding a portion between the seal part 92 and the seal part 94 of the female member 80.

Furthermore, a gate (omitted from the figure) for guiding molten resin toward the cavity 268 is provided on the fixed die 262.

A method for manufacturing the female member 80 of the present embodiment will be described next.

First, the fixed die 262, the movable die 264, and the sliding die 266 are closed to form the cavity 268 for forming the female member 80.

Next, molten resin is guided through the gate to the cavity 268 of the die 260, which is in a heated state.

After cavity 268 has been filled with the molten resin, the molten resin is cooled. Note that the molten resin may be either naturally cooled or forcibly cooled.

After the molten resin has been cooled and cured, the sliding die 266 is moved orthogonal to the die opening and closing direction toward a direction away from the cavity 268. Next, the movable die 264 is moved toward the die opening direction. Finally, a resin molded product formed in the shape of the cavity 268, such as, for example, an eject pin, or the like, is removed (that is, the resin molded product is demolded) from the fixed die 262. This forms the female member 80, which is a resin molded product.

Here, with the method for manufacturing the female member 80, a sealing surface (surface on the male member 62 side in the cylinder axial direction Y in FIG. 27) of the seal part 92 of the female member 80 is formed by the molding surface 269A of the fixed die 262. Since a portion of the molding surface 269A corresponding to the sealing surface of the seal part 92 is continuous in a circumferential direction, the sealing surface is formed continuously in the circumferential direction. In other words, no parting line that would divide the sealing surface in the circumferential direction is formed in the sealing surface of the seal part 92. Accordingly, since no parting line is formed in the sealing surface of the seal part 92, the female member 80 manufactured by the method for manufacturing the female member 80 described above provides stable water stopping performance between the male member 62 and the female member 80. Specifically, water stopping performance between the male member 62 and the female member 80 is made more stable because no parting lines are formed in the circular convex part 78 of the male member 62 and no parting lines are formed in the sealing surface (surface that makes contact with the circular convex part 78 illustrated in FIG. 27) of the seal part 92 of the female member 80.

Additionally, with the method for manufacturing the female member 80 described above, a sealing surface (surface on the opposite side of the male member 62 in the cylinder axial direction Y in FIG. 27) of the seal part 94 of the female member 80 is formed by the molding surface 269B of the movable die 264. Since a portion of the molding surface 269B corresponding to the sealing surface of the seal part 94 is continuous in a circumferential direction, the sealing surface is formed continuously in the circumferential direction. In other words, no parting line that would divide the sealing surface in the circumferential direction is formed in the sealing surface of the seal part 94. Accordingly, since no parting line is formed in the sealing surface of the seal part 94, the female member 80 manufactured by the method for manufacturing the female member 80 described above provides stable water stopping performance between the female member 80 and the vehicle body 102.

Additionally, with the method for manufacturing the female member 80 described above, since no parting lines are formed in the sealing surface of the seal part 92 or in the sealing surface of the seal part 94, no post-processing such as deburring, or the like, is required. Additionally, since no parting lines are formed in the sealing surface of the seal part 92 or in the sealing surface of the seal part 94 of the female member 80 manufactured by the manufacturing method described above, there is no need to provide a separate gasket to ensure water stopping performance, and thus an increase in a number of components for the clip 60 can be suppressed.

Although the die 250 used to manufacture the aforementioned male member 62 was formed by making the movable die 254 having the molding surface 259B movable in a die opening and closing direction with respect to the fixed die 252 having the molding surface 259A, the configuration according to the present disclosure is not limited thereto. For example, the fixed die 252 may be a movable die that is able to move, and the movable die 254 may be a fixed die that is unable to move.

Furthermore, although the die 260 used to manufacture the aforementioned female member 80 was formed by making the movable die 264 having the molding surface 269B movable in a die opening and closing direction with respect to the fixed die 262 having the molding surface 269A, the configuration according to the present disclosure is not limited thereto. For example, the fixed die 262 may be a movable die that is able to move, and the movable die 264 may be a fixed die that is unable to move.

A use and effect of the present embodiment will be described next.

With the clip 60, the pin part 66 is first inserted into the first inserting position inside the cylindrical part 82 of the female member 80 while the head part 64 of the male member 62 is being pushed. As illustrated in FIG. 25, when the pin part 66 is inserted into the first inserting position, the pin part 66 engages with the engaging hook 84. Specifically, the tip end part of the engaging hook 84 of the cylindrical part 82 fits into the engaging concave part 74 of the pin part 66 and the engaging hook 84 engages with the engaging concave part 74. This engagement prevents the pin part 66 from moving in the removal direction with respect to the cylindrical part 82. Since the engaging concave part 74 and the engaging hook 84 are engaged in this way when the pin part 66 is in the first inserting position, the male member 62 and the female member 80 are held in a provisionally assembled state.

Next, the head part 64 of the male member 62 is pushed and the cylindrical part 82 of the female member 80 is inserted toward the attaching hole 102A of the vehicle body 102. Here, since the pin part 66 is in the first inserting position when the cylindrical part 82 is inserted toward the attaching hole 102A, the elastic deformation of the engaging hook 86 toward the inside of the cylindrical part is allowed by the tolerance part 68 of the pin part 66, and thus the engaging hook 86 elastically deforms toward the inside of the cylindrical part and the cylindrical part 82 passes the engaging hook 86 and is inserted into the attaching hole 102A. When the engaging hook 86 passes through the attaching hole 102A, the engaging hook 86 returns elastically and the engaging hook 86 engages with the edge of the attaching hole 102A. This engagement keeps the female member 80 from coming out of the attaching hole 102A. Furthermore, when, almost simultaneous with the aforementioned engagement, the pin part 66 reaches the second inserting position, the engaging hook 86 is supported from inside the cylindrical part by the stopping part 70 of the pin part 66, thus stopping the elastic deformation of the engaging hook 86 toward the inside of the cylindrical part. Additionally, as illustrated in FIG. 27, with the present embodiment, since the engaging hook 86 is pushed toward the outside of the cylindrical part 82 by the stopping part 70 when the pin part 66 is in the second inserting position, the engagement of the engaging hook 86 toward the edge of the attaching hole 102A is strengthened. This holds the female member 80 in the vehicle body 102. Furthermore, when the pin part 66 is in the second inserting position, the pin part 66 and the engaging hook 84 engage. Specifically, a hook part tip end of the engaging hook 84 fits into the engaging concave part 76 of the pin part 66 and the engaging hook 86 engages with the engaging concave part 76. This engagement prevents the pin part 66 from moving in the removal direction with respect to the cylindrical part 82. Since the engaging concave part 76 and the engaging hook 86 are engaged in this way when the pin part 66 is in the second inserting position, the male member 62 and the female member 80 are held in the assembly state.

In this way, the clip 60 and the retainer 106 are both attached to the vehicle body 102.

Here, with the clip 60, after the male member 62 and the female member 80 are provisionally assembled, the cylindrical part 82 of the female member 80 is inserted toward the attaching hole 102A of the vehicle body 102 while the head part 64 of the male member 62 is being pushed, which causes the female member 80 to be held in the vehicle body 102, the male member 62 and female member 80 to be assembled (the assembly), and the retainer 106 to be attached to the vehicle body 102 together with the clip 60. That is, since the clip 60 can be attached to the vehicle body 102 by a single pushing operation, the clip can be attached to the vehicle body 102 by a simple operation. Furthermore, since a plurality of clips 60 of the male member 62 is provided on the retainer 106, a plurality of the clips 60 can be attached to the vehicle body 102 at the same time by a single push operation of the retainer 106. That is, with the clip attaching structure, the steps required for the push operation that attaches the clip 60 to the vehicle body 102 can be reduced.

Furthermore, with the clip 60, since the external form of the head part 64 of the male member 62 is made larger than the external form of the female member 80, pushing the head part 64 is easier than in, for example, a configuration where the external form of the head part is smaller than the external form of the female member, thus making an operation for pushing the pin part 66 in simpler.

Furthermore, with the clip 60, since the engaging hook 84 and the engaging concave part 74 engage when the pin part 66 is in the first inserting position, movement of the pin part 66 toward the removal direction (side opposite the inserting direction) is limited. That is, the pin part 66 is held in the cylindrical part 82 by the engagement between the engaging hook 84 and the engaging concave part 74 when the pin part 66 is in the first inserting position.

Additionally, with the clip 60, since the engaging hook 84 and the engaging concave part 76 engage when the pin part 66 is in the second inserting position, movement of the pin part 66 toward a side opposite the inserting direction is limited. That is, the pin part 66 is held in the cylindrical part 82 by the engagement between the engaging hook 84 and the engaging concave part 76 when the pin part 66 is in the second inserting position.

With the clip 60, since, as illustrated in FIG. 27, the seal part 92 of the female member 80 makes contact with the circular convex part 78 of the male member 62 when the pin part 66 is in the second inserting position, a seal is formed between the male member 62 and the female member 80 by the seal part 92. Furthermore, since the seal part 94 makes contact with the peripheral part of the attaching hole 102A when the cylindrical part 82 of the female member 80 is inserted into the attaching hole 102A, a seal is formed between the vehicle body 102 and the female member 80 by the seal part 94. Thus, when the clip 60 is attached to the vehicle body 102, a seal is formed between the male member 62 and the female member 80 by the seal part 92 and a seal is formed between the female member 80 and the vehicle body 102 by the seal part 94. That is, the clip 60 can be attached to the vehicle body 102 and secured in a sealed state by a simple operation.

Figure 28:
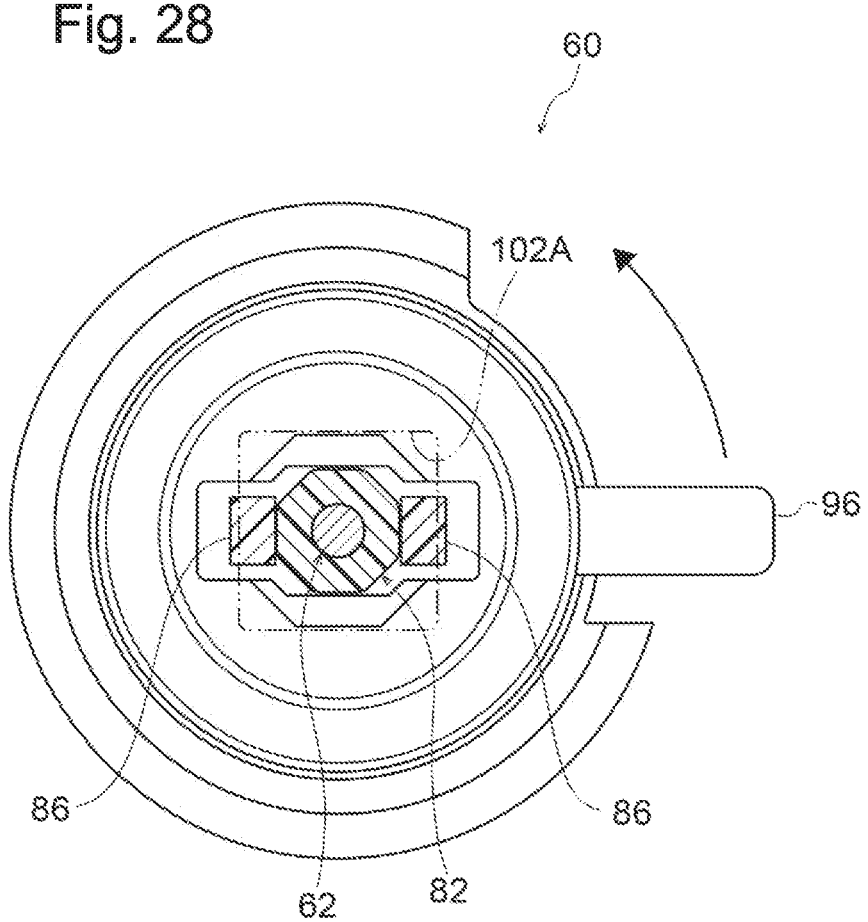
FIG. 28 is a bottom surface view of a female member illustrating an operating lever in a first rotating position.
Figure 29:
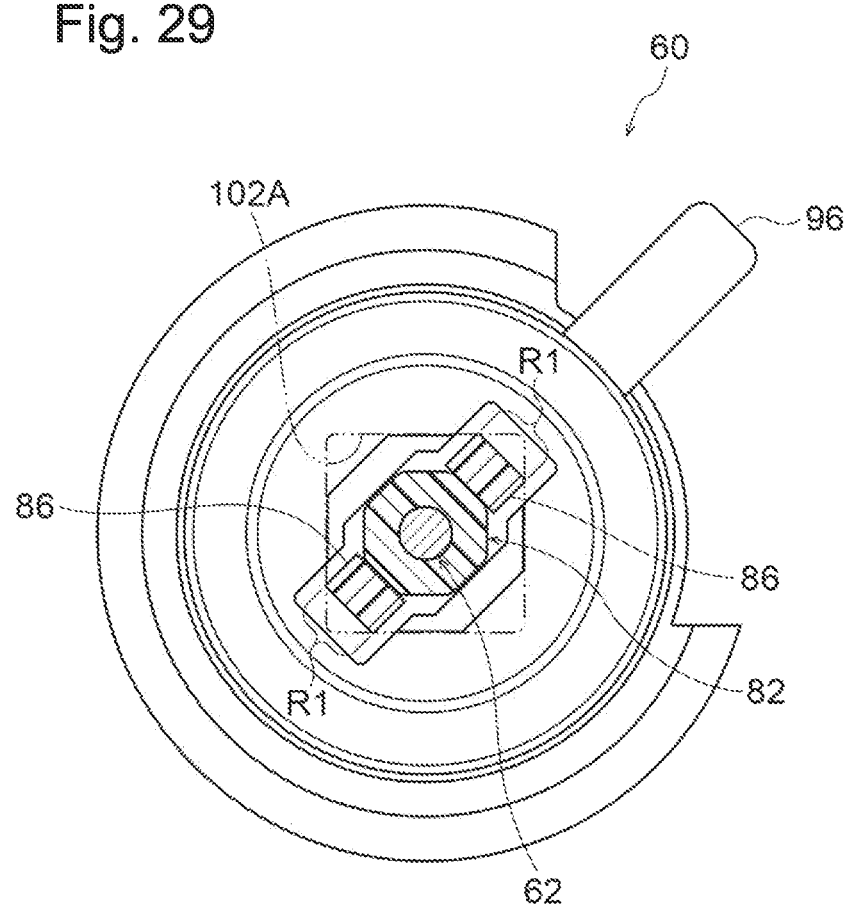
FIG. 29 is a bottom surface view of a female member illustrating the operating lever in a second rotating position.

Furthermore, with the clip 60, when the operating lever 96 is rotated and operated from the first rotating position to the second rotating position with the clip 60 attached to the vehicle body 102 together with the retainer 106, that is, with the engaging hook 84 and the edge of the attaching hole 102A engaged (reference) as illustrated in FIG. 28, the cylindrical part 82 rotates with respect to the pin part 66 and the pair of engaging hooks 84 is lined up diagonal to the attaching hole 102A, and thus, as illustrated in FIG. 29, the engaging hook 84 and the edge of the attaching hole 102A are disengaged because the engagement therebetween is released. In this state, the clip 60 can be removed from the vehicle body 102 by pulling the clip 60 from the attaching hole 102A. Thus, with the clip 60, detachment (that is, removal) from the vehicle body 102 is made possible by the simple operation of rotating the operating lever 96.

One embodiment of the present disclosure has been described above, however, the present disclosure is not limited thereto, and thus, of course, may be subject to various modifications so long as such modifications do not deviate from the gist thereof.

Note that all of the disclosures according to Japanese Patent Application No. 2019-166538 submitted on Sep. 12, 2019 are incorporated in the present specification by reference.

All of the documents, patent applications, and technical standards described in the present specification are incorporated in the present specification by reference to the same degree as when it is specifically and individually stated that individual documents, patent applications, and technical standards are incorporated therein by reference.

BRIEF DESCRIPTION OF THE REFERENCE NUMERALS

20 Clip
22 Male member
24 Head part
26 Pin part
26A One end part
26B Another end part
28 Tolerance part
30 Stopping part
34 Engaging concave part (first engaged part)
36 Engaging concave part (second engaged part)
38 Circular convex part
40 Female member
42 Cylindrical part
44 Engaging hook (first engaging hook)
46 Engaging hook (second engaging hook)
48 Engaging hook (third engaging hook)
50 Flange part
52 Seal part (first seal part)
54 Seal part (second seal part)
60 Clip
62 Male member
64 Head part
66 Pin part
66A One end part
66B Another end part
68 Tolerance part
70 Stopping part
74 Engaging concave part (first engaged part)
76 Engaging concave part (second engaged part)
78 Circular convex part
80 Female member
82 Cylindrical part
84 Engaging hook (first engaging hook)
86 Engaging hook (second engaging hook)
90 Flange part
92 Seal part (first seal part)
94 Seal part (second seal part)
96 Operating lever
102 Vehicle body
102A Attaching hole
104 Retainer (holding member)
106 Retainer (holding member)

What is claimed is:

1. A clip comprising:
a male member having a head part and a rod-shaped pin part that protrudes from the head part; and
a female member having a cylindrical part into which when inserted into an attaching hole of an attaching member, the pin part is inserted, a first engaging hook provided on the cylindrical part that engages the pin part at both a first inserting position of the pin part and a second inserting position thereof that is further on a back side in an inserting direction than the first inserting position, and a second engaging hook provided on the cylindrical part and elastically deformable in an inward/outward direction of the cylindrical part that engages an edge of the attaching hole when the cylindrical part is inserted into the attaching hole,
wherein an external form of the head part is larger than an external form of the female member, and
the pin part is provided with a tolerance part that allows elastic deformation of the second engaging hook toward an inside of the cylindrical part when the pin part is in the first inserting position, and a stopping part positioned more on the head part side than the tolerance part that supports the second engaging hook from inside the cylindrical part and stops elastic deformation of the second engaging hook toward the inside of the cylindrical part when the pin part is in the second inserting position.

2. A clip according to claim 1, wherein the second engaging hook is pushed toward the outside of the cylindrical part by the stopping part when the pin part is in the second inserting position.

3. A clip according to claim 1, wherein the head part is provided with a circular convex part that surrounds the pin part, and
the female member includes a flange part that extends from an end part on a side opposite an inserting direction of the cylindrical part in a direction orthogonal to the inserting direction, an elastically deformable circular first seal part that extends from an outer circumference of the flange part and abuts the circular convex part when the pin part is in the second inserting position, and a second seal part that extends from the outer circumference of the flange part and makes contact with the peripheral part of the attaching hole when the cylindrical part is inserted into the attaching hole.

4. A clip according to claim 1, wherein the pin part includes a first engaged part that engages the first engaging hook and limits movement of the pin part toward a side opposite the inserting direction when the pin part is in the first inserting position, and a second engaged part that engages the first engaging hook and limits movement of the pin part toward a side opposite the inserting direction when the pin part is in the second inserting position.

5. A clip according to claim 4, wherein the cylindrical part is provided with a third engaging hook in a circumferential direction in a position different from the first engaging hook, and the pin part is provided with a third engaged part that engages the third engaging hook when the pin part is in the second inserting position.

6. A clip according claim 1, wherein the attaching hole includes a first region with a size to allow insertion of the cylindrical part without elastically deforming the second engaging hook, and a second region adjacent to the first region that is smaller than the first region, having a size to allow insertion of the cylindrical part by elastically deforming the second engaging hook, wherein the cylindrical part is relatively rotatable with respect to the pin part with the pin part as the axis, wherein the female member includes an operating part for rotating the cylindrical part, and wherein the second engaging hook is positioned in the second region of the attaching hole and engages an edge of the second region when the operating part is in a first rotating position, and the second engaging hook is positioned in the first region of the attaching hole and does not engage an edge of the first region when the operating part is in a second rotating position.

7. A clip attaching structure comprising:

an attaching member in which the attaching hole is formed;

and the clip according to claim 1.

8. A clip attaching structure according to claim 7, wherein the attaching member is a vehicle body, and a plurality of the clips of the male member is provided on a holding member that holds a vehicle component to be attached to the vehicle body.

* * * * *